United States Patent
Hasegawa et al.

(10) Patent No.: US 9,862,834 B2
(45) Date of Patent: Jan. 9, 2018

(54) COMPOSITE REINFORCING MATERIAL AND MOLDING MATERIAL

(71) Applicant: GRAPHENE PLATFORM CORPORATION, Tokyo (JP)

(72) Inventors: Shoji Hasegawa, Tokyo (JP); Nagisa Kamiya, Tokyo (JP)

(73) Assignee: GRAPHENE PLATFORM CORPORATION (JP)

( * ) Notice: Subject to any disclaimer, the term of this patent is extended or adjusted under 35 U.S.C. 154(b) by 0 days.

(21) Appl. No.: 14/982,939

(22) Filed: Dec. 29, 2015

(65) Prior Publication Data

US 2016/0194474 A1    Jul. 7, 2016

Related U.S. Application Data

(63) Continuation of application No. 14/764,505, filed as application No. PCT/JP2015/058331 on May 19, 2015.

(30) Foreign Application Priority Data

Sep. 9, 2014   (JP) .................... PCT/JP2014/073838
Feb. 27, 2015  (JP) .................... PCT/JP2015/055977

(51) Int. Cl.
    *C08K 3/04*     (2006.01)
    *C09C 1/46*     (2006.01)
    (Continued)

(52) U.S. Cl.
    CPC ............... *C09C 1/46* (2013.01); *C01B 32/19* (2017.08); *C01B 32/20* (2017.08); *C01B 32/225* (2017.08);
    (Continued)

(58) Field of Classification Search
    CPC .................... C08K 3/04–3/046; C08L 101/00
    See application file for complete search history.

(56) References Cited

U.S. PATENT DOCUMENTS 7,071,258 B1   7/2006  Jang et al. .................... 524/496
8,900,486 B2   12/2014 Simmons et al. ............ 252/511
(Continued)

FOREIGN PATENT DOCUMENTS

CN   102015529   4/2011   ............. B82Y 31/04
CN   102224623   10/2011  ........ H01M 10/0525
(Continued)

OTHER PUBLICATIONS

Notice of Acceptance from related Australian Patent Application Serial No. 2015242995, dated Mar. 16, 2016 (2 pgs).
(Continued)

*Primary Examiner* — Peter D. Mulcahy
(74) *Attorney, Agent, or Firm* — Hayes Soloway P.C.

(57) ABSTRACT

A method of producing the composite reinforcing material includes a step of kneading at least a graphite-based carbon material and a reinforcing material into a base material. The graphite-based carbon material is characterized by having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more:

$$\text{Rate}(3R) = P3/(P3+P4) \times 100 \qquad \text{(Equation 1)}$$

wherein
  P3 is a peak intensity of a (101) plane of the rhombohedral graphite layer (3R) based on the X-ray diffraction method, and
(Continued)

P4 is a peak intensity of a (101) plane of the hexagonal graphite layer (2H) based on the X-ray diffraction method.

12 Claims, 28 Drawing Sheets

(51) Int. Cl.

| | | |
|---|---|---|
| C09D 11/52 | (2014.01) | |
| H01M 4/587 | (2010.01) | |
| H01M 4/62 | (2006.01) | |
| C09D 11/037 | (2014.01) | |
| C04B 14/02 | (2006.01) | |
| C04B 28/14 | (2006.01) | |
| C04B 35/56 | (2006.01) | |
| C04B 35/63 | (2006.01) | |
| C04B 35/83 | (2006.01) | |
| C09C 3/04 | (2006.01) | |
| C09D 7/12 | (2006.01) | |
| C09D 11/03 | (2014.01) | |
| C10M 125/02 | (2006.01) | |
| C09D 5/24 | (2006.01) | |
| H01M 4/36 | (2006.01) | |
| H01M 10/0525 | (2010.01) | |
| C01B 32/20 | (2017.01) | |
| C01B 32/225 | (2017.01) | |
| C01B 32/19 | (2017.01) | |
| C08L 101/00 | (2006.01) | |
| C10M 169/04 | (2006.01) | |
| H01M 4/02 | (2006.01) | |
| H01M 10/052 | (2010.01) | |

(52) U.S. Cl.
CPC .......... *C04B 14/024* (2013.01); *C04B 28/14* (2013.01); *C04B 35/5611* (2013.01); *C04B 35/6303* (2013.01); *C04B 35/83* (2013.01); *C08K 3/04* (2013.01); *C08L 101/00* (2013.01); *C09C 3/04* (2013.01); *C09D 5/24* (2013.01); *C09D 7/1216* (2013.01); *C09D 11/03* (2013.01); *C09D 11/037* (2013.01); *C09D 11/52* (2013.01); *C10M 125/02* (2013.01); *C10M 169/04* (2013.01); *H01M 4/02* (2013.01); *H01M 4/366* (2013.01); *H01M 4/587* (2013.01); *H01M 4/625* (2013.01); *H01M 10/0525* (2013.01); *C01P 2002/72* (2013.01); *C01P 2002/74* (2013.01); *C01P 2002/77* (2013.01); *C01P 2004/54* (2013.01); *C01P 2004/61* (2013.01); *C04B 2235/425* (2013.01); *C10M 2201/041* (2013.01); *C10M 2203/003* (2013.01); *C10M 2203/022* (2013.01); *C10M 2207/401* (2013.01); *C10N 2230/10* (2013.01); *C10N 2240/10* (2013.01); *C10N 2250/10* (2013.01); *H01M 10/052* (2013.01)

(56) References Cited

U.S. PATENT DOCUMENTS

| | | | |
|---|---|---|---|
| 9,023,308 B2 | 5/2015 | Shankman | .................... 508/116 |
| 2011/0245378 A1 | 10/2011 | Russ et al. | .................... 523/440 |
| 2013/0102084 A1 | 4/2013 | Loh et al. | ....................... 436/94 |
| 2014/0378599 A1 | 12/2014 | Sawa et al. | .................. 524/496 |
| 2015/0073082 A1* | 3/2015 | Mukohata | ............... C08K 3/04 |
| | | | 524/427 |

FOREIGN PATENT DOCUMENTS

| | | | |
|---|---|---|---|
| CN | 103834235 | 6/2014 | |
| JP | 2000-348727 | 12/2000 | |
| JP | 2009114435 | 5/2009 | ............... C08F 8/46 |
| JP | 2010254822 | 11/2010 | ............... C08K 3/04 |
| JP | 2011522920 | 8/2011 | ............... C08J 5/24 |
| JP | 2013079348 | 5/2013 | ............... C08K 3/04 |
| JP | 2013533892 | 8/2013 | ............... C08K 3/04 |
| JP | 2013536141 | 9/2013 | ............. C01B 31/02 |
| JP | 2013233790 | 11/2013 | ............... B29B 7/90 |
| JP | 2014201676 | 10/2014 | ............... C08K 3/04 |
| JP | 2014210916 | 11/2014 | ............... C08K 3/00 |
| WO | WO2009147415 | 12/2009 | ............... C08K 3/04 |
| WO | WO2011120008 | 9/2011 | ............... C08K 3/04 |
| WO | WO2011162727 | 12/2011 | ............. C01B 31/04 |
| WO | WO2013146213 | 10/2013 | ............... C08K 3/04 |
| WO | WO2014064432 | 5/2014 | ............. C09D 11/02 |
| WO | WO2014/087992 | 12/2014 | |

OTHER PUBLICATIONS

British Official Action from related British Patent Application Serial No. GB1513693.0, dated Mar. 16, 2016 (3 pgs) (no reference cited therein).
British Official Action from related British Patent Application Serial No. GB1513693.0, dated Dec. 18, 2015 (2 pgs) (no reference cited therein).
Singapore Official Action from related Singapore Patent Application Serial No. 11201600972Y, dated Aug. 16, 2016 with translation (6 pgs) (references cited therein are already of record).
Korean Official Action from related Korean Patent Application Serial No. 10-2015-7023472, dated Dec. 2, 2015 (5 pgs) (reference cited therein are already of record).
Canadian Official Action from related Canadian Patent Application Serial No. 2,916,788, dated Feb. 5, 2016 (4 pgs) (no references cited therein).
European Search Report from related European Patent Application Serial No. 15741472.3, dated Sep. 9, 2016 (11 pgs).
Chinese Patent Office Second Office Action issued in corresponding Chinese Application Serial No. 201580000440.X dated Mar. 28, 2017 (13 Pages).
Chinese Patent Office First Office Action issued in corresponding Chinese Application Serial No. 201580000440.X dated Sep. 13, 2016 (13 Pages).
International Preliminary Report on Patentability issued in application No. PCT/JP2015/058331, dated Mar. 23, 2017 (9 pgs).
U.S. Appl. No. 14/704,505, filed Jul. 29, 2015.
Inagaki et al., "Structural Change of Graphite with Grinding," Feb. 1, 1973, No. 74, pp. 76-82 (7 pgs).
Japanese Decision to a Grant Patent issued in application No. 2015-516124, dated Jun. 19, 2015 (6 pgs).
Japanese Office Action issued in application No. 2015-516124, dated May 20, 2015 (10 pgs).
Kawasaki, S. Classification of solid carbon materials and their structural characteristics, Nagoya Institute of Technology, undated, (49 pgs).
Noda et al., "Changes of Probabilities $P_1$, $P_{ABA}$, $P_{ABC}$ with Heat Treatment of Carbons," Sep. 16, 1966, No. 47, pp. 14-23 (10 pgs).
Parthasarathy et al., "Spectroscopic and X-ray diffraction studies on fluid deposited rhombohedral graphite from the Eastern Ghats Mobile Belt, India," Current Science, vol. 90, No. 7, Apr. 10, 2006, pp. 995-1000 (6 pgs).

* cited by examiner

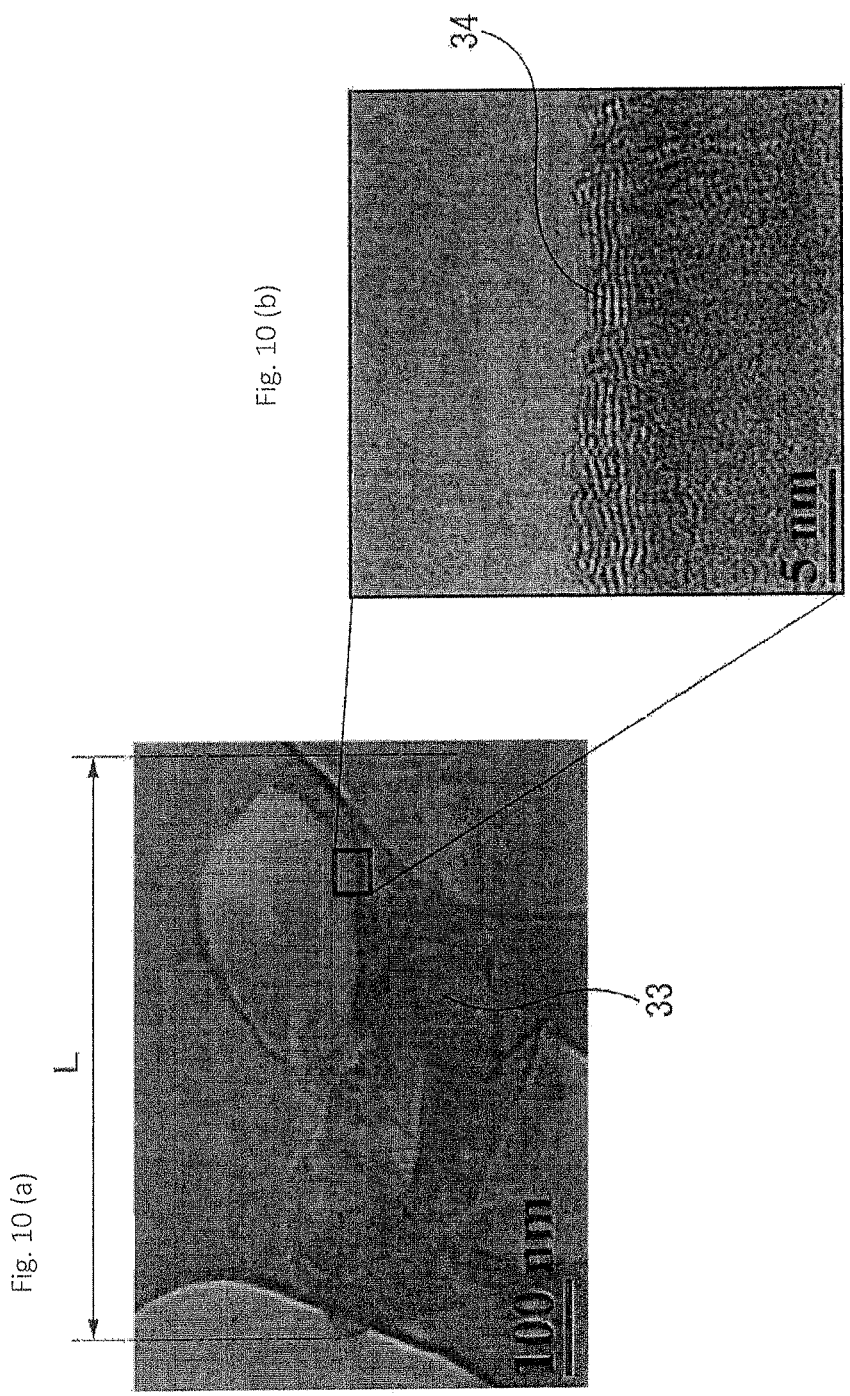

FIG. 13

| Sample No. | 1 | 2 | 3 |
|---|---|---|---|
| Distribution of Number of Layers | | | |
| P3/(P3+P4) | 23% | 31% | 38% |
| 10 layers or less | 10% | 25% | 38% |
| P1/P2 | 0.008 | 0.016 | 0.016 |
| P1 | 120 | 342 | 128 |
| P2 | 15000 | 20993 | 8253 |
| P3 | 50 | 321 | 173 |
| P4 | 160 | 698 | 282 |

| Sample No. | 4 | 5 | 6 | 7 |
|---|---|---|---|---|
| Distribution of Number of Layers | | | | |
| P3/(P3+P4) | 42% | 46% | 51% | 58% |
| 10 layers or less | 62% | 68% | 76% | 82% |
| P1/P2 | 0.014 | 0.012 | 0.014 | 0.012 |
| P1 | 253 | 162 | 66 | 151 |
| P2 | 18226 | 13157 | 4675 | 12850 |
| P3 | 320 | 396 | 170 | 452 |
| P4 | 435 | 466 | 162 | 325 |

P3/(P3+P4)=28%
10 layers or less: 25%

P3/(P3+P4)=31%
10 layers or less: 25%

↓ 10～20μm

←―― 100～500μm ――→

THICKNESS: SEVERAL HUNDREDS OF nm

←― 1～30μm ―→

↓ 10nm～1μm

COMPOSITE REINFORCING MATERIAL AND MOLDING MATERIAL

CROSS REFERENCE TO RELATED APPLICATION

This application is a continuation of co-pending U.S. patent application Ser. No. 14/764,505, filed Jul. 29, 2015, which is entirely incorporated herein by reference.

TECHNICAL FIELD

The present invention relates to a composite reinforcing material and a method of producing a composite reinforcing material.

BACKGROUND ART

In recent years, addition of various nanomaterials has been studied for purposes of downsizing and weight saving in various fields. In particular, for environmental or resource problems, carbon materials such as graphene, CNT (carbon nanotube) and fullerene have attracted attention as nonmetal nanomaterials, and a resin composite reinforcing material in which a reinforcing material (a filler) is dispersed in a resin for a purpose of improving physical properties of the resin (tensile strength, elastic modulus, etc.) has been proposed.

For example, a resin composite reinforcing material in which a carbon material such as flaked graphite is added to a thermoplastic resin such as polyolefin has been disclosed (Patent Literature 1). Further, a composite reinforcing material having flaked graphite and an inorganic filler added thereto for a purpose of improving physical properties (tensile elastic modulus, rigidity, and impact resistance) has been disclosed (Patent Literature 2 and Patent Literature 3).

Of these, graphene is superior to other carbon materials in aspect of mass productivity, handleability, etc., as well as performance, and expectations have been placed on graphene in various fields. However, when a reinforcing material such as graphene is kneaded into a resin, the reinforcing material needs to be dispersed uniformly in order to sufficiently exhibit an improvement effect of physical properties.

In order to obtain high-quality graphene which, for example, has fewer graphite layers, a method in which weak ultrasonic waves are applied to natural graphite in a solvent (NMP) for a long time (7-10 hours), large agglomerates which deposit on the bottom are then removed, and the supernatant is then centrifuged to concentrate it, thereby obtaining a graphene dispersion in which 20% or more of flakes are of a single layer, 40% or more of flakes are of double or triple layers, and less than 40% of flakes are of 10 layers or more of a graphite material and are dispersed at about 0.5 g/L, has been considered (Patent Literature 2).

CITATION LIST

Patent Literature

PTL 1: JP-A-2010-254822 ([0032]-[0038])
PTL 2: JP-A-2014-201676 ([0048]-[0064])
PTL 3: JP-A-2014-210916 ([0043])
PTL 4: WO 2014/064432 (lines 4-9 on page 19)
PTL 5: JP-A-2013-079348 ([0083])
PTL 6: JP-A-2009-114435 ([0044])

Non Patent Literature

NPL 1: Structural Change of Graphite with Griding; authors: Michio INAGAKI, Hisae MUGISHIMA, and Kenji HOSOKAWA; Feb. 1, 1973 (Received)

NPL 2: Changes of Probabilities P1, PABA, PABC with Heat Treatment of Carbons; authors: Tokiti NODA, Masaaki IWATSUKI, and Michio INAGAKI; Sep. 16, 1966 (Received)

NPL 3: Spectroscopic and X-ray diffraction studies on fluid deposited rhombohedral graphite from the Eastern Ghats Mobile Belt, India; G. Parthasarathy, Current Science, Vol. 90, No. 7, 10 Apr. 2006

NPL 4: Classification of solid carbon materials and their structural characteristics; Nagoya Institute of Technology; Shinji KAWASAKI

SUMMARY OF INVENTION

Technical Problem

However, the methods disclosed in Patent Literatures 1, 2 and 3 use commercially available flaked graphite, which is hardly dispersed simply by kneading due to aggregating nature of the flaked graphite, thus an effect of flaked graphite is not sufficiently obtained. However, even when the graphite material (20% or more of flakes of a single layer, 40% or more of flakes of double or triple layers, and less than 40% of flakes of 10 layers or more) obtained by the method disclosed in Patent Literature 4 was mixed into a solvent, the amount of graphene dispersed in the solvent was small, and only a dilute graphene dispersion could be obtained. Additionally, although it is considered that a supernatant is collected and concentrated, it takes a long time for treatments to repeat the steps of collecting and concentrating the supernatant, and there is a problem of inferior production efficiency of a graphene dispersion. As disclosed in Patent Literature 4, even by subjecting natural graphite to an ultrasonic treatment for a long time, only weak parts of the surface are exfoliated, other large parts do not contribute to the exfoliation, and it is considered as a problem that the amount of exfoliated graphene is small.

Further, in order to increase mechanical strength, a reinforcing material is generally added to a base material such as a polymer, however, depending on an addition amount of a reinforcing material, original properties (outer appearance) of a polymer may be affected (Patent Literature 5).

In Patent Literatures 2 and 3 mentioned above, physical properties contributing to rigidity (hardness), such as a elastic modulus and impact resistance are improved by adding a reinforcing material. Similar results were obtained in Example 5 of the present specification (undisclosed invention before making the present application).

Further, for a purpose of improving strength of tensile (tensile strength), addition of a reinforcing material has been performed (e.g., Patent Literature 1). In general, in order to increase the tensile strength, a reinforcing material (a filler) is suitably a string-like material that includes carbon fibers, glass fibers, cellulose fibers, and the like. It has been further proposed that tensile yield stress is increased by using a compatibilizer for a purpose of preventing a string-like material from coming off a base material (Patent Literature 6). However it has been found that mechanical strength and the like that include tensile strength, etc. are not sufficiently improved just by adding a string-like material. The reason is considered that a base material is too soft so that a string-like material comes off together with the base material.

As mentioned above, there has been a problem that an amount of graphene that is exfoliated is normally small by processing natural graphite without any treatments. However, as a result of earnest studies, by carrying out predetermined treatments to graphite serving as a source material, there is obtained a graphite-based carbon material (a graphene precursor), from which graphene is easily exfoliated, the graphene being able to be dispersed at a high concentration or to a high degree. A part or whole of the graphene precursor is exfoliated by ultrasonic waves, stirring and kneading to produce a mixed material being "graphene-like graphite", containing material from the graphene precursor to graphene. A size, thickness, etc. of the graphene-like graphite is not limited since they are variable depending on an addition amount, a process time, etc. of the graphene precursor, however, it is preferred that the graphene-like graphite is more flaked. That is, in another words, the graphite-based carbon material (the graphene precursor) is graphite capable of being easily exfoliated and dispersed as the graphene-like graphite by existing stirring and kneading processes or devices.

It was found that, by dispersing a small amount of the graphene-like graphite together with a reinforcing material in a base material, mechanical strength, such as bending modulus, compressive strength, tensile strength, and Young's modulus, could be improved. Moreover, it was found that the composite reinforcing material could be produced without substantially changing a conventional production method.

The invention has been completed focusing on such problems and an object of the invention is to provide a composite reinforcing material and a method of producing a composite reinforcing material excellent in mechanical strength.

Another object of the invention is to provide a composite reinforcing material capable of exhibiting desired characteristics even though an amount of graphene-like graphite dispersed/added in a base material is small.

Yet another object of the invention is to provide a composite reinforcing material excellent in mechanical strength by using a conventional production process.

Solution to Problem

In order to solve the above-described problems, a method of producing a composite reinforcing material of the present invention comprises a step of kneading at least a graphite-based carbon material and a reinforcing material into a base material, the graphite-based carbon material having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more:

$$\text{Rate}(3R) = P3/(P3+P4) \times 100 \qquad \text{Equation 1}$$

wherein

P3 is a peak intensity of a (101) plane of the rhombohedral graphite layer (3R) based on the X-ray diffraction method, and P4 is a peak intensity of a (101) plane of the hexagonal graphite layer (2H) based on the X-ray diffraction method.

Furthermore, a composite reinforcing material being produced by kneading at least a graphite-based carbon material and a reinforcing material into a base material, thereby exfoliating a part or whole of the graphite-based carbon material, the graphite-based carbon material having a rhombohedral graphite layer (3R) and a hexagonal graphite layer (2H), wherein a Rate of the rhombohedral graphite layer (3R) and the hexagonal graphite layer (2H), based on an X-ray diffraction method, which is defined by following Equation 1 is 31% or more:

$$\text{Rate}(3R) = P3/(P3+P4) \times 100 \qquad \text{Equation 1}$$

wherein

P3 is a peak intensity of a (101) plane of the rhombohedral graphite layer (3R) based on the X-ray diffraction method, and P4 is a peak intensity of a (101) plane of the hexagonal graphite layer (2H) based on the X-ray diffraction method.

Furthermore, a composite reinforcing material comprises at least a reinforcing material, graphene-like graphite exfoliated from a graphite-based carbon material, and a reinforcing material, dispersed in a base material, the graphite-based carbon material characterized by having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more:

$$\text{Rate}(3R) = P3/(P3+P4) \times 100 \qquad \text{(Equation 1)}$$

wherein

P3 is a peak intensity of a (101) plane of the rhombohedral graphite layer (3R) based on the X-ray diffraction method, and P4 is a peak intensity of a (101) plane of the hexagonal graphite layer (2H) based on the X-ray diffraction method.

According to the features, the composite material is excellent in mechanical strength. This is because, it is speculated that, the effect of increasing an elastic modulus of a base material itself and the effect of preventing a reinforcing material from coming off were synergistically exhibited by dispersing graphene-like graphite in a base material. Among mechanical strength such as bending modulus, compressive strength, tensile strength, and Young's modulus, the composite material is excellent in the tensile strength as one example.

The reinforcing material is characterized by being a microparticle in a string-like, linear, or flake-like shape.

According to the feature, the microparticle is surrounded by the graphene-like graphite, thus a reinforcing function of the microparticle can be sufficiently exerted.

The microparticle is characterized by having an aspect ratio of 5 or more.

According to the feature, a reinforcing function of the microparticle can be further sufficiently exerted.

A weight ratio of the sum of the graphite-based carbon material and graphene-like graphite to the reinforcing material is characterized by being 1/100 or more and less than 10.

According to the feature, a reinforcing function of the reinforcing material can be efficiently exerted.

The base material is characterized by being a polymer.

According to the feature, a composite reinforcing material excellent in mechanical strength can be obtained.

The base material is characterized by being an inorganic material.

According to the feature, a composite reinforcing material excellent in mechanical strength can be obtained.

A molding material is characterized by comprising the composite reinforcing material.

According to the feature, a molding material used for 3D printing and the like, excellent in mechanical strength, can be obtained.

BRIEF DESCRIPTION OF DRAWINGS

FIGS. 10(a) and (b) are TEM images of a graphite-based carbon material (graphene) dispersed in a dispersion.

FIG. 13 is a diagram which shows distributions of the number of layers of graphite-based carbon materials each dispersed in dispersions that were produced using Samples 1 to 7 as precursors.

DESCRIPTION OF EMBODIMENTS

Figure 1A:
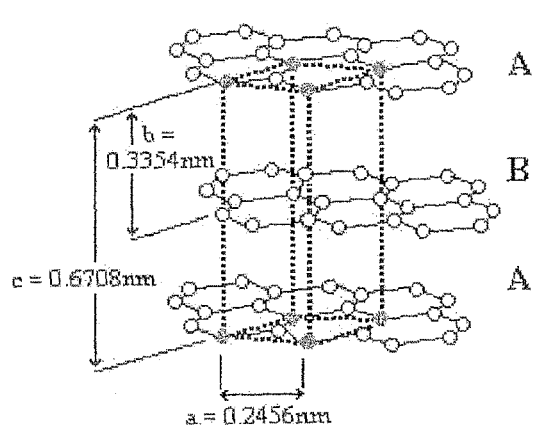
FIGS. 1(a) and 1(b) are figures which show a crystal structure of graphite, where 1(a) refers to a crystal structure of hexagonal crystals, and 1(b) refers to a crystal structure of rhombohedral crystals.
Figure 1B:
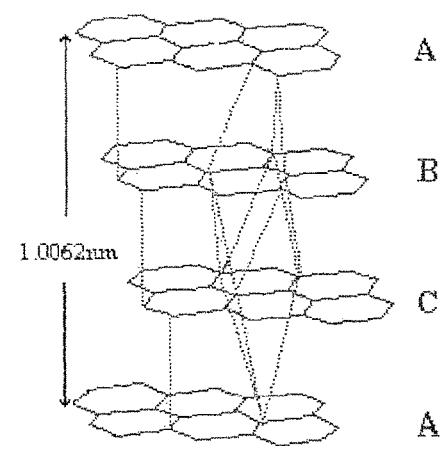

The invention focuses on a crystal structure of graphite, and, at first, matters relating to the crystal structure will be explained. It has been known that natural graphite is classified into three types of crystal structures, namely hexagonal crystals, rhombohedral crystals and disordered crystals, depending on an overlapping manner of layers. As shown in FIG. 1, hexagonal crystals have a crystal structure in which layers are arranged in the order of ABABAB . . . , while rhombohedral crystals have a crystal structure in which layers are arranged in the order of ABCABCABC . . . .

In natural graphite, there are almost no rhombohedral crystals in a stage where natural graphite is excavated. However, about 14% of rhombohedral crystals exist in general natural graphite-based carbon materials because pulverization or the like is carried out in a purification stage. In addition, it has been known that a proportion of rhombohedral crystals converges on about 30% even when pulverization is carried out during purification for a long time (Non-Patent Literatures 1 and 2)

Moreover, a method in which graphite is expanded by heating, rather than with physical forces such as pulverization, thereby flaking the graphite. However, even when graphite is treated with a heat of 1600 K (about 1,300° C.), a proportion of rhombohedral crystals is about 25% (Non-Patent Literature 3) Furthermore, the proportion is up to about 30% even when heat of an extremely high temperature of 3000° C. is applied thereto (Non-Patent Literature 2)

Thus, although it is possible to increase a proportion of rhombohedral crystals by treating natural graphite with physical forces or heat, the upper limit is about 30%.

Hexagonal crystals (2H), which are included in natural graphite at a high level, are very stable, and an interlayer van der Waals force between their graphene layers is shown by Equation 3 (Patent Literature 2). By applying an energy exceeding this force, graphene is exfoliated. An energy required for the exfoliation is inversely proportional to the cube of the thickness. Therefore, in a thick state where numerous layers are overlapped, graphene is exfoliated by a weak physical force such as by very feeble ultrasonic waves. However, in a case where graphene is exfoliated from somewhat thin graphite, a very large energy is required. In other words, even if graphite is treated for a long time, only weak parts of the surface are exfoliated, and large parts remain not exfoliated.

$$Fvdw = H \cdot A / (6\pi \cdot t^3)$$ Equation 3

Fvdw: Van der Waals' force
H: Hamaker constant
A: Surface area of graphite or graphene
t: Thickness of graphite or graphene The present inventors succeeded in increasing a proportion of rhombohedral crystals (3R), which had been increased to only about 30% by treatments of pulverization or heating to an extremely high temperature, to 30% or more by carrying out predetermined treatments, as shown below, to natural graphite. The following findings were obtained as results of experiments and studies. That is, when a content of rhombohedral crystals (3R) in a graphite-based carbon material is higher, particularly when the content is 31% or more, there is a tendency that graphene is easily exfoliated by use of such a graphite-based carbon material as a precursor, thereby easily obtaining a highly concentrated and dispersed graphene dispersion or the like. For the reason, it is considered that, when a shear force or the like is applied to rhombohedral crystals (3R), a deformation occurs between layers, i.e. a deformation in the entire structure of the graphite becomes large, and graphene is easily exfoliated independently of the van der Waals' force. Accordingly, in the invention, a graphite-based carbon material, from which graphene is easily exfoliated by carrying out predetermined treatments to natural graphite, and which makes it possible to disperse graphene at a high concentration or to a high degree, is called a graphene precursor. Hereinafter, a method of producing a graphene precursor showing predetermined treatments, a crystal structure of the graphene precursor, and a graphene dispersion using the graphene precursor will be described in that order in examples below.

Here, in the specification, a graphene refers to a flake-like or sheet-like graphene which is a crystal of a mean size of 100 nm or more but which is not a fine crystal of a mean size of several nanometers to tens of nanometers, and which has 10 layers or less.

Additionally, since graphene is a crystal with a mean size of 100 nm or more, when artificial graphite and carbon black, which are amorphous (microcrystal) carbon materials other than natural graphite, are even treated, graphene cannot be obtained (Non-Patent Literature 4)

Further, in the specification, a graphene composite means a composite which is produced by using the graphite-based carbon material useful as a graphene precursor according to the invention, i.e. a graphite-based carbon material having a Rate (3R) of 31% or more (e.g. Samples 2-7 of Example 1, samples 2, 21, . . . of Example 5 described below)

Hereinafter, examples for carrying out the composite reinforcing material and the molding material according to the present invention will be described.

EXAMPLE 1

<As to Production of a Graphite-based Carbon Material Useful as a Graphene Precursor>

A method for obtaining a graphite-based carbon material useful as a graphene precursor by a production apparatus A using a jet mill and plasma shown in FIG. 3 will be explained. As an example, the production apparatus A refers to a case in which plasma is applied for the radiowave-force-based treatment and in which the jet mill is used for the physical-force-based treatment.

Figure 3:
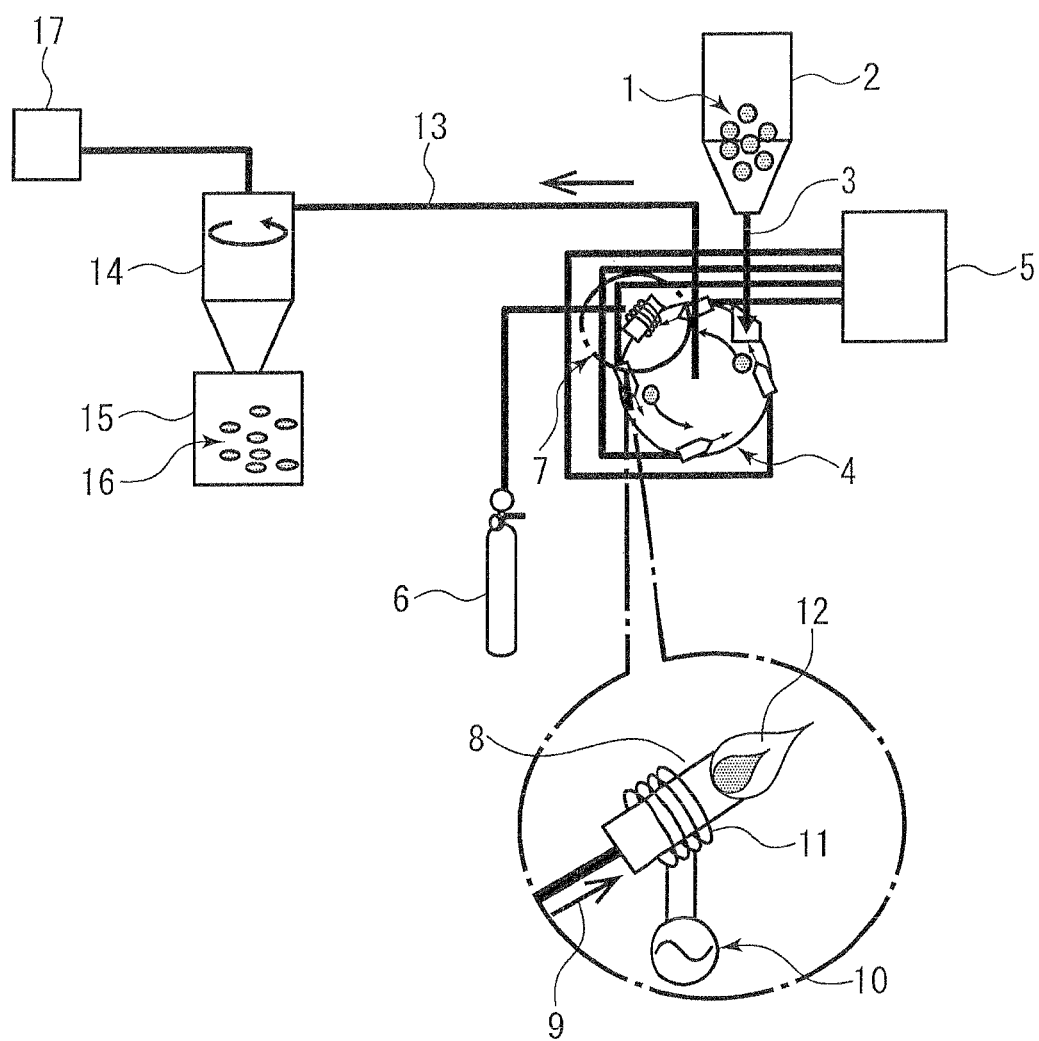
FIG. 3 is a diagram which illustrates a production apparatus A using a jet mill and plasma of Example 1.

In FIG. 3, the symbol 1 refers to a particle of 5 mm or less of a natural graphite material (flaky graphite ACE-50 manufactured by Nippon Graphite Industries, ltd.); the symbol 2 refers to a hopper which stores the natural graphite material 1; the symbol 3 refers to a Venturi nozzle which discharges the natural graphite material 1 from the hopper 2; the symbol 4 refers to a jet mill which jets the air which has been pumped from a compressor 5, while being divided into eight places, to thereby allow the natural graphite material to collide against the inside of a chamber by a jet blast; and the symbol 7 refers to a plasma generator which sprays a gas 9, such as oxygen, argon, nitrogen or hydrogen, through a nozzle 8 from a tank 6 and which applies a voltage to a coil 11, wound around the outer periphery of the nozzle 8, from a high-voltage power supply 10, thereby generating plasma inside the chamber of the jet mill 4, and the plasma generator is provided in each of four places inside the chamber. The symbol 13 refers to a pipe which connects the jet mill 4 and a dust collector 14 to one another; the symbol 14 refers to a dust collector; the symbol 15 refers to a collection container; the symbol 16 refers to a graphite-based carbon material (graphene precursor); and the symbol 17 refers to a blower.

Next, the production method will be explained. Conditions for the jet mill and plasma are as follows.

The conditions for the jet mill are as follows.
Pressure: 0.5 MPa
Air volume: 2.8 m³/min
Nozzle inner Diameter: 12 mm
Flow rate: about 410 m/s
The conditions for plasma are as follows.
Output: 15 W
Voltage: 8 kV
Gas species: Ar (purity 99.999 vol %)
Gas flow rate: 5 L/min It is considered that the natural graphite materials 1, which have been charged into the chamber of the jet mill 4 from the Venturi nozzle 3, are accelerated to the sonic velocity or higher inside the chamber, and are pulverized by impact between the natural graphite materials 1 or by impact of them against the wall, and that, simultaneously, the plasma 12 discharges an electric current or excites the natural graphite materials 1, acts directly on atoms (electrons), and increases deformations of crystals, thereby promoting the pulverization. When the natural graphite materials 1 turn into fine particles of a certain particle diameter (about 1 to 10 μm), their mass is reduced, the centrifugal force is weakened, and, consequently, the natural graphite materials 1 are pumped out from the pipe 13 which is connected to the center of the chamber.

A gas including graphite-based carbon materials (graphene precursors), which have been flowed from the pipe 13 into a cylindrical container of the chamber of the dust collector 14, forms a spiral flow, and drops the graphite-based carbon materials 16, which collide with the internal wall of the container, to a collection container 15 below, while an ascending air current generates in the center of the chamber due to a tapered container part of the downside of the chamber, and the gas is emitted from the blower 17 (so-called cyclone effects). According to the production apparatus A in this example, about 800 g of a graphene precursor from 1 kg of the raw materials, i.e. natural graphite materials 1, is used. The graphite-based carbon material (graphene precursors) 16 was obtained (recovery efficiency: about 80%)

Next, based on the production apparatus B using a ball mill and microwaves shown in FIG. 4, a method for obtaining a graphite-based carbon material useful as a graphene precursor will be described. The apparatus B refers to, as an example, a case where microwaves are applied as the radiowave-force-based treatment and where a ball mill is used for the physical-force-based treatment.

Figure 4A:
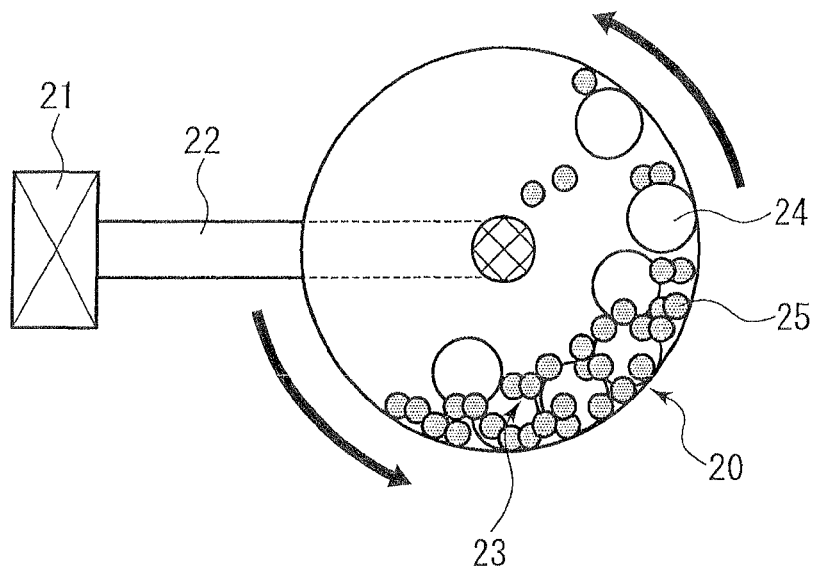
FIG. 4 is a figure which illustrates a production apparatus B using a ball mill and magnetron of Example 1, where 4(a) is a diagram which illustrates a pulverizing state, and 4(b) is a diagram which illustrates a state where graphite-based carbon materials (precursors) are collected.
Figure 4B:
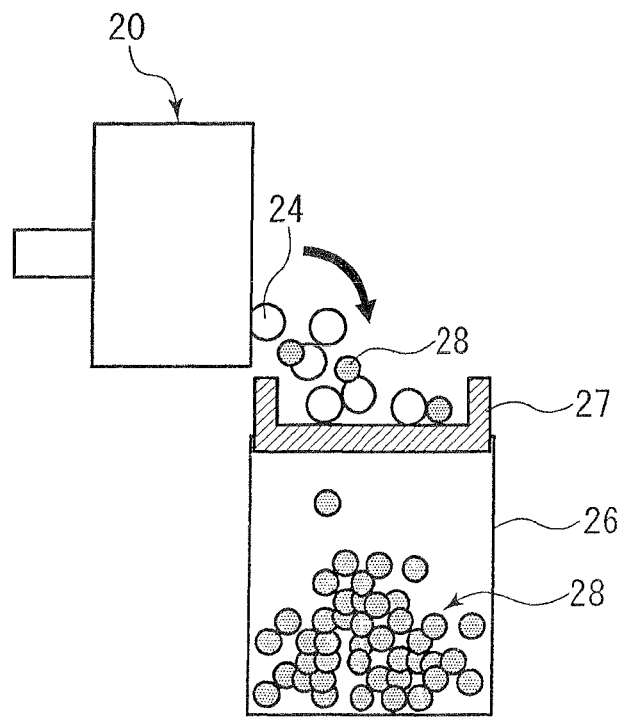

In FIGS. 4(a) and (b), the symbol 20 refers to the ball mill; the symbol 21 refers to a microwave generator (magnetron); the symbol 22 refers to a wave guide; the symbol 23 refers to a microwave inlet; the symbol 24 refers to a media; the symbol 25 refers to particles of 5 mm or less of a natural graphite material (flaky graphite ACB-50 manufactured by Nippon Graphite Industries, ltd.); the symbol 26 refers to a collection container; the symbol 27 refers to a filter; and the symbol 28 refers to graphite-based carbon material (graphene precursors)

Next, the production method will be explained. Conditions for the ball mill and the microwave generator are as follows.

The conditions for the ball mill are as follows.
Rotational speed: 30 rpm
Media size: φ5 mm
Media species: zirconia balls
Pulverization time: 3 hours The conditions for the microwave generator (magnetron) are as follows.
Output: 300 N
Frequency; 2.45 GHz
Irradiation method: Intermittent 1 kg of natural graphite carbon raw materials 25 and 800 g of media 24 are charged into the chamber of the ball mill 20, the chamber is closed, and the mixture is treated at a rotational speed of 30 rpm for 3 hours. During the treatment, microwaves are irradiated intermittently (for 20 seconds every 10 minutes) to the chamber. It is considered that the microwave irradiation acts directly on atoms (electrons) of the raw materials, thus increasing deformations of the crystals. After the treatment, media 24 are removed by the filter 27, and thus, powder of about 10 μm of graphite-based carbon materials (precursors) 28 can be collected in the collection container 26.

<As to an X-Ray Diffraction Profile of Graphite-based Carbon Materials (Graphene Precursors)>

Figure 5:
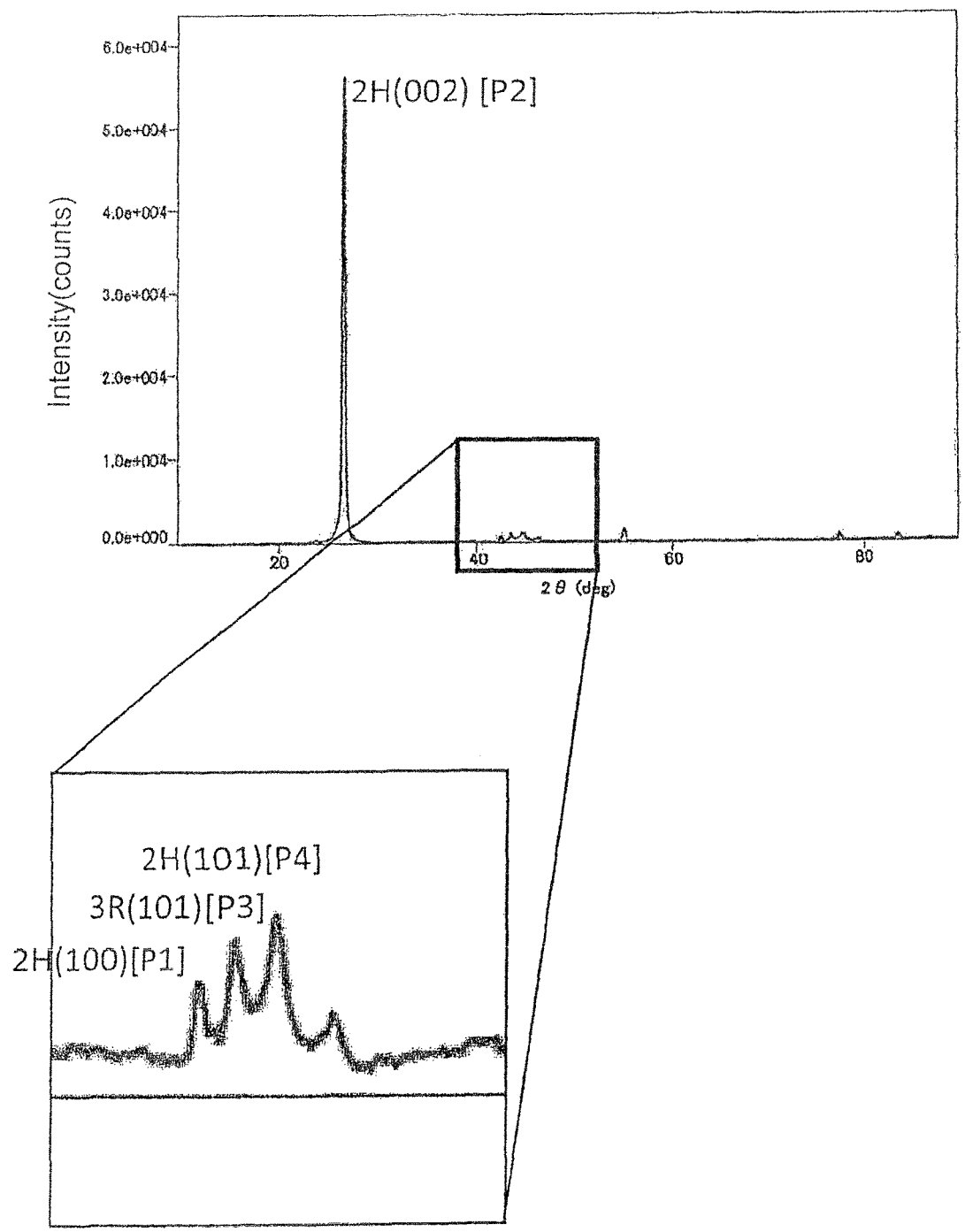
FIG. 5 is a diagram which shows an X-ray diffraction profile of a graphite-based carbon material of Sample 5 produced by the production apparatus B according to Example 1.
Figure 6:
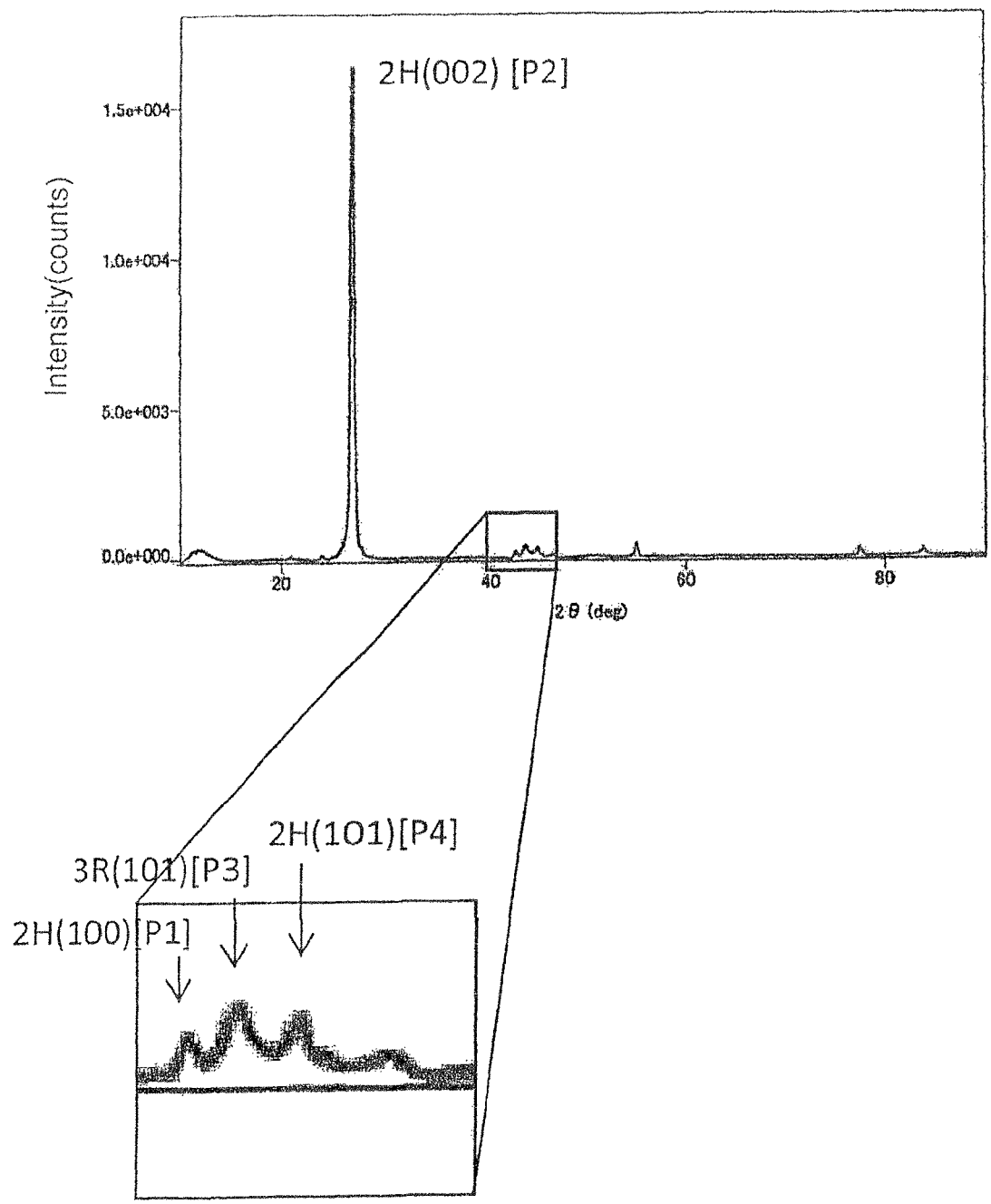
FIG. 6 is a diagram which shows an X-ray diffraction profile of a graphite-based carbon material of Sample 6 produced by the production apparatus A according to Example 1.
Figure 7:
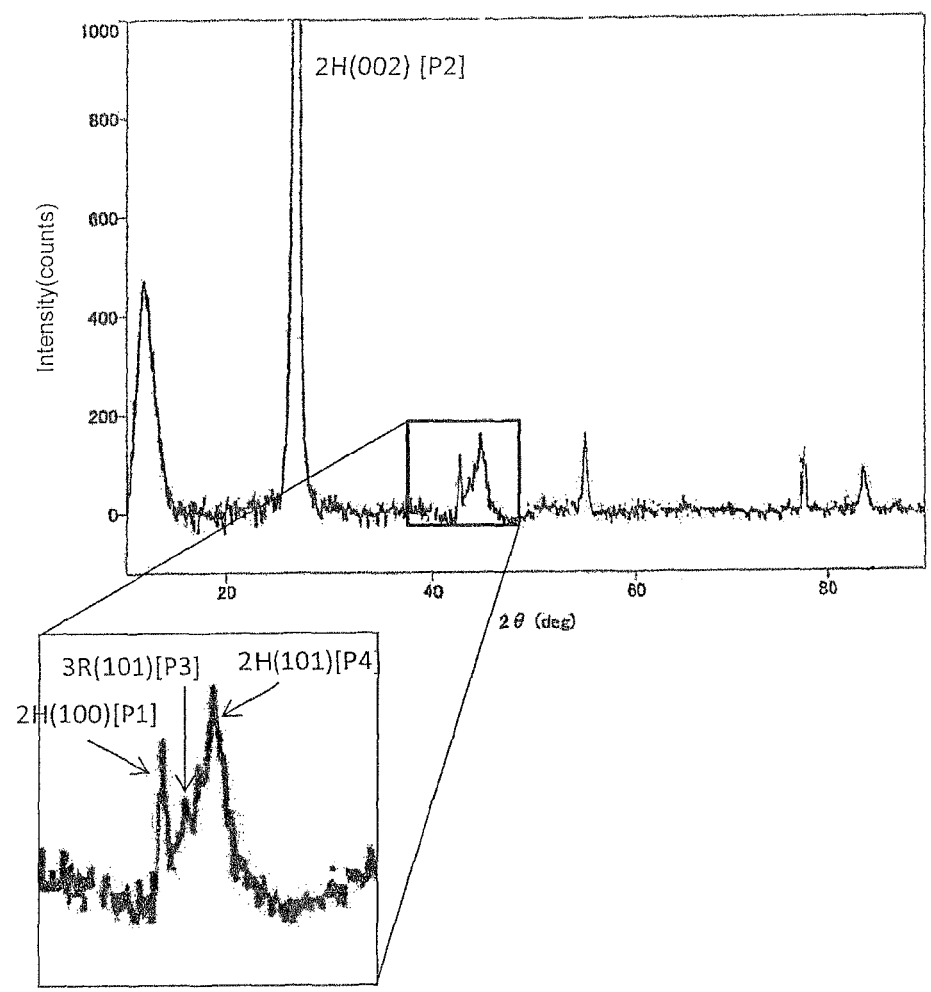
FIG. 7 is a diagram which shows an X-ray diffraction profile of a graphite-based carbon material of Sample 1 indicating a comparative example.

With reference to FIGS. 5 to 7, X-ray diffraction profiles and crystal structures will be described with respect to graphite-based natural materials (Samples 6 and 5) produced by the production apparatuses A and B, and the powder of about 10 μm of graphite-based natural materials (Sample 1: a comparative example) obtained by using only the ball mill of the production apparatus B.

The measurement conditions for the X-ray diffraction apparatus are as follows.
Source: Cu Kα ray
Scanning speed: 20°/min
Tube voltage: 40 kV
Tube current: 30 mA According to the X-ray diffraction method (horizontal-sample-mounting-model multi-purpose X-ray diffractometer Ultima IV manufactured by Rigaku Corporation), each sample shows peak intensities P1, P2, P3 and P4 in the planes (100), (002) and (101) of hexagonal crystals 2H and in the plane (101) of rhombohedral crystals 3R. Therefore, these peak intensities will be explained.

Here, the measurements of X-ray diffraction profile have been used the so-called standardized values at home and abroad in recent years. This horizontal-sample-mounting-model multi-purpose X-ray diffractometer Ultima IV manufactured by Rigaku Corporation is an apparatus which can measure X-ray diffraction profile in accordance with JIS R 7651:2007 "Measurement of lattice parameters and crystallite sizes of carbon materials". In addition, Rate (3R) is the ratio of the diffraction intensity obtained by the Rate (3R)= P3/(P3+P4)×100, even if the value of the diffraction intensity is changed, the value of Rate (3R) is not changes. Means that the ratio of the diffraction intensity is standardized, it is commonly used to avoid performing the identification of the absolute value substance and its value does not depend on measurement devices.

As shown in FIG. 5 and Table 1, Sample 5 produced by the production apparatus B, which applies a treatment with a ball mill and a microwave treatment, had high rates of peak intensities P3 and P1, and a Rate (3R) defined by Equation 1 showing a rate of P3 to a sum of P3 and P4 was 46%. Additionally, the intensity ratio P1/P2 was 0.012.

$$Rate(3R)=P3/(P3+P4)\times 100 \qquad \text{Equation 1}$$

wherein
P1 is a peak intensity of a (100) plane of the hexagonal graphite layer (2H) based on the X-ray diffraction method,
P2 is a peak intensity of a (002) plane of the hexagonal graphite layer (2H) based on the X-ray diffraction method,
P3 is a peak intensity of a (101) plane of the rhombohedral graphite layer (3R) based on the X-ray diffraction method, and
P4 is a peak intensity of a (101) plane of the hexagonal graphite layer (2H) based on the X-ray diffraction method.

TABLE 1

|  | Peak intensities [counts · deg] (2θ [°]) |
| --- | --- |
| Hexagonal crystals 2H (100) [P1] | 162 (42.33) |
| Hexagonal crystals 2H (002) [P2] | 13157 (26.50) |
| Rhombohedral crystals 3R (101) [P3] | 396 (43.34) |
| Hexagonal crystals 2H (101) [P4] | 466 (44.57) |

In the same manner, as shown in FIG. 6 and Table 2, Sample 6 produced by the production apparatus A, which applies a treatment based on the jet mill and a treatment based on plasma, had high rates of peak intensities P3 and P1, and the Rate (3R) was 51%. In addition, the intensity ratio P1/P2 was 0.014.

TABLE 2

|  | Peak intensities [counts · deg] (2θ [°]) |
|---|---|
| Hexagonal crystals 2H (100) [P1] | 66 (42.43) |
| Hexagonal crystals 2H (002) [P2] | 4,675 (26.49) |
| Rhombohedral crystals 3R (101) [P3] | 170 (43.37) |
| Hexagonal crystals 2H (101) [P4] | 162 (44.63) |

Furthermore, as shown in FIG. 7 and Table 3, Sample 1 indicating a comparative example produced with only the ball mill had a small rate of a peak intensity P3, compared with Samples 5 and 6, and the Rate (3R) was 23%. In addition, the intensity ratio P1/P2 was 0.008.

TABLE 3

|  | Peak intensities [counts · deg] (2θ [°]) |
|---|---|
| Hexagonal crystals 2H (100) [P1] | 120 (42.4) |
| Hexagonal crystals 2H (002) [P2] | 15,000 (26.5) |
| Rhombohedral crystals 3R (101) [P3] | 50 (43.3) |
| Hexagonal crystals 2H (101) [P4] | 160 (44.5) |

Figure 2:
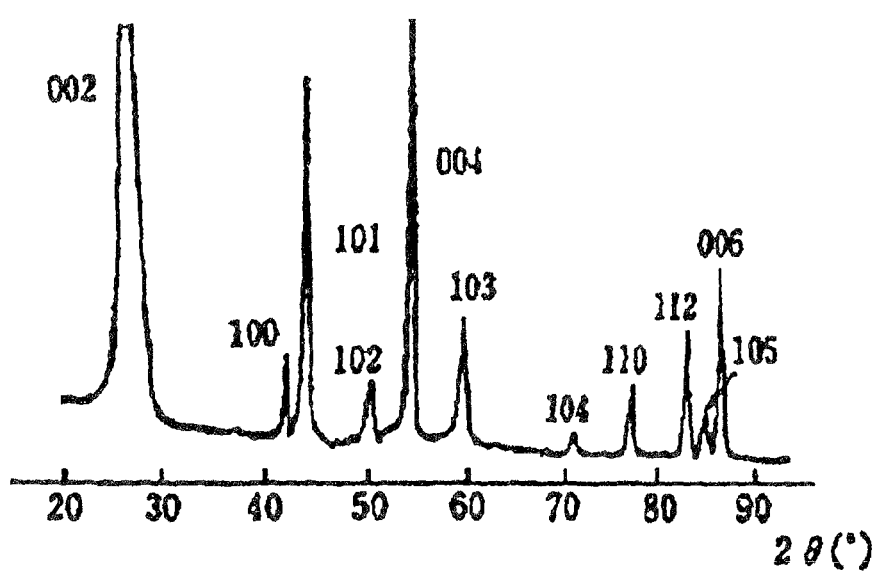
FIG. 2 is a diagram which shows an X-ray diffraction profile of general natural graphite.

Thus, Sample 5 produced by the production apparatus B of Example 1, and Sample 6 produced by the production apparatus A of Example 1 had Rates (3R) of 46% and 51%, respectively, and it was shown that their Rates (3R) were 40% or more, or 50% or more, compared with the natural graphite shown in FIG. 2 and Sample 1 indicating a comparative example.

Next, graphene dispersions were produced using the above-produced graphene precursors, and their easiness in exfoliation of graphene was evaluated.

<As to Graphene Dispersions>

Figure 8:
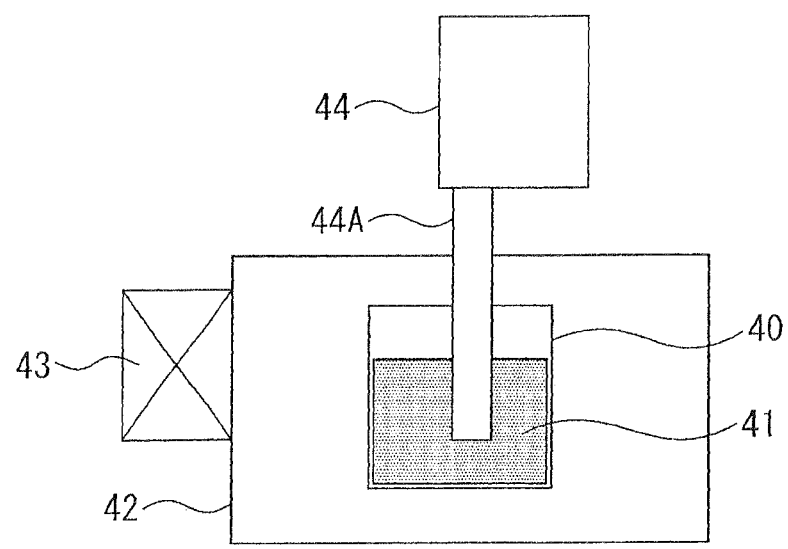
FIG. 8 is a diagram which shows a dispersion-producing apparatus which produces a dispersion using a graphite-based carbon material as a precursor.

A method for producing a graphene dispersion will be explained with reference to FIG. 8. FIG. 8 shows, as an example, a case where an ultrasonic treatment and a microwave treatment are combined in a liquid when a graphene dispersion is produced.

(1) 0.2 g of a graphite-based carbon material useful as a graphene precursor and 200 ml of N-methylpyrrolidone (NMP) which serves as dispersing medium are charged to a beaker 40.

(2) The beaker 40 is put into a chamber 42 of a microwave generator 43, and an ultrasonic trembler 44A of an ultrasonic horn 44 is inserted into dispersing medium 41 from the upper direction.

(3) The ultrasonic horn 44 is activated, and ultrasonic waves of 20 kHz (100 W) are continuously applied thereto for 3 hours.

(4) While the above ultrasonic horn 44 is actuated, the microwave generator 43 is activated to apply microwaves of 2.45 GHz (300 W) intermittently (irradiation for 10 seconds every 5 minutes) thereto.

Figure 9:
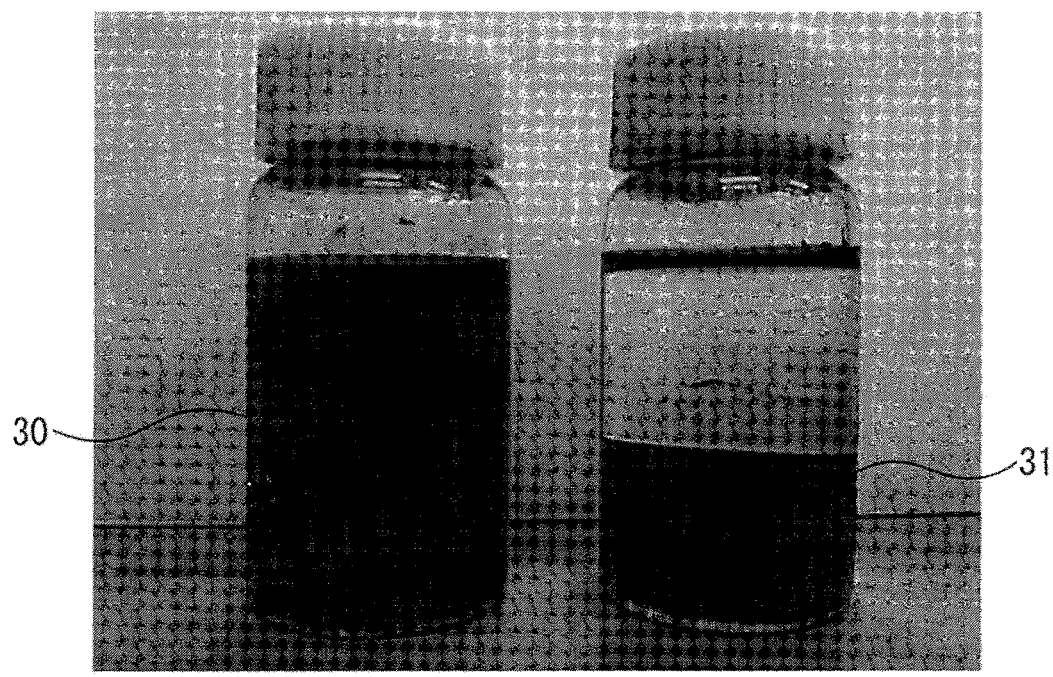
FIG. 9 is a diagram which shows dispersing states of dispersions produced by using graphite-based carbon materials of Sample 1 indicating a comparative example, and Sample 5 produced by the production apparatus B of Example 1.

FIG. 9 refers to appearances of graphene dispersions produced in the above-described way when 24 hours had passed.

Although a portion of the graphene dispersion 30 using Sample 5 produced by the production apparatus B was deposited, a product entirely showing a black color was observed. For this, it is considered that a large portion of the graphite-based carbon materials used as graphene precursors are dispersed in a state where graphene is exfoliated from them.

In the dispersion 31 using Sample 1 indicating a comparative example, most of the graphite-based carbon materials were deposited, and it was confirmed that a portion thereof floated as a supernatant. From the facts, it is considered that graphene was exfoliated from a small portion thereof and that they floated as the supernatant.

Furthermore, the graphene dispersion produced in the above-described way was diluted to an observable concentration, was coated onto a sample stage (TEM grid), and the grid was dried. Thus, the size and the number of layers of graphene was observed in the captured image of a transmission electron microscope (TEM), as shown in FIG. 10. In addition, the grid coated with the diluted supernatant was used for Sample 1. For example, in the case of FIG. 10, the size corresponds to a maximum length L of a flake 33, which was 600 nm, based on FIG. 10(a). As for the number of layers, the end face of the flake 33 was observed in FIG. 10(b), and overlapping graphene layers were counted, thereby calculating the number of layers as 6 layers (a portion indicated by the symbol 34). In this way, the size and the number of layers were measured with respect to each flake ("N" indicates the number of flakes), and the numbers of graphene layers and the sizes shown in FIGS. 11 and 12 were obtained.

Figure 11A:
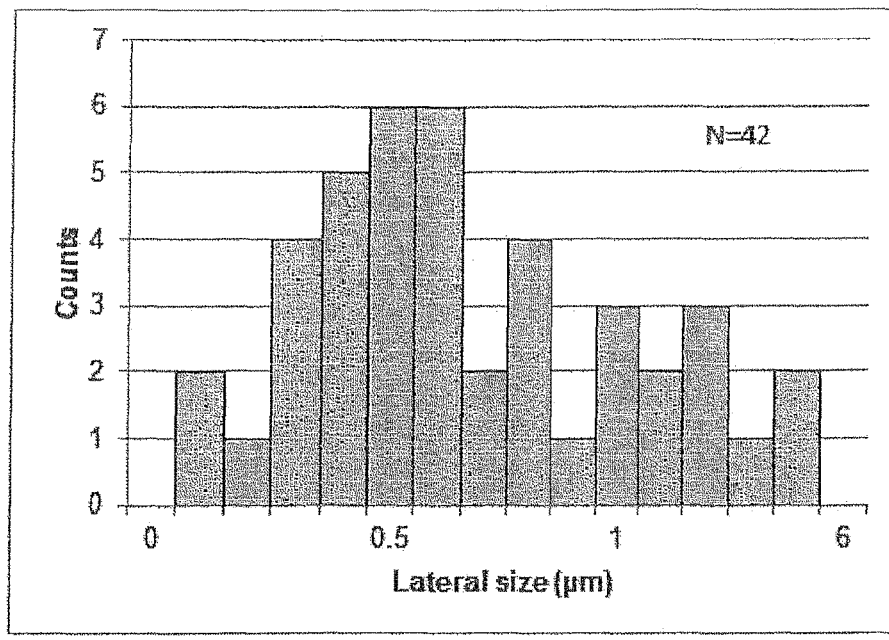
FIGS. 11(a) and 11(b) are figures which shows distribution states of a graphite-based carbon material dispersed in a dispersion which was produced using a graphite-based carbon material (precursor) of Sample 5, where 11(a) is a diagram which shows an average size distribution, while 11(b) is a diagram which shows a distribution of the number of layers.
Figure 11B:
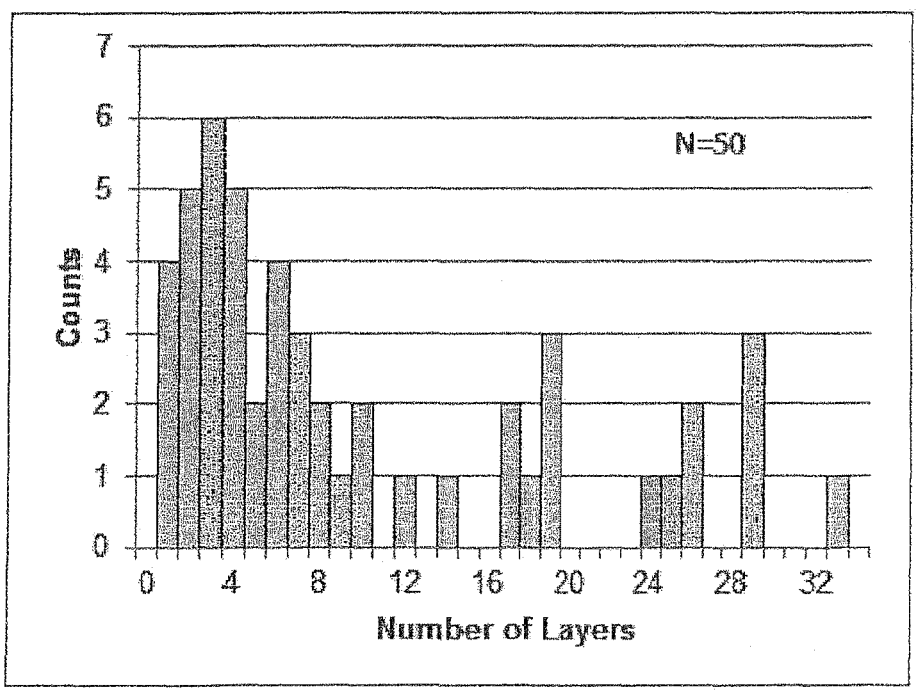

With reference to FIG. 11(a), a particle size distribution (distribution of sizes) of thin flakes included in the graphene dispersion of Sample 5 (Rate (R3) of 46%) produced by the production apparatus B of Example 1 was a distribution having a peak of 0.5 μm. In addition, in FIG. 11(b), as to the number of layers, a distribution which had a peak in 3 layers and in which graphene having 10 layers or less were 68% was observed.

Figure 12A:
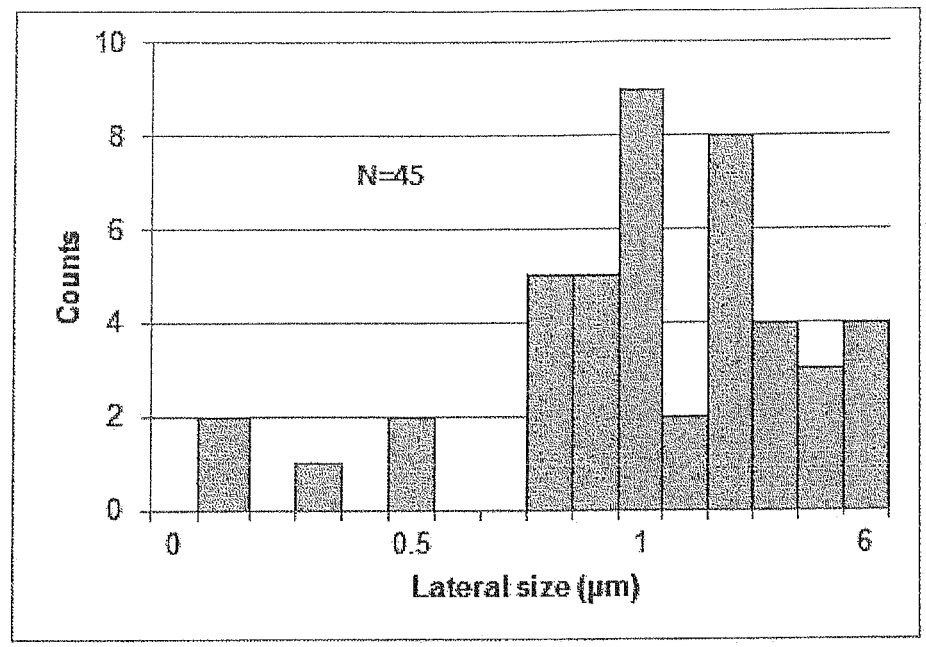
FIGS. 12(a) and 12(b) are figures which show a distribution state of a graphite-based carbon material dispersed in a dispersion which was produced using a graphite-based carbon material of Sample 1 indicating the comparative example, where 12(a) is a diagram showing an average size distribution, and 12(b) is a diagram showing a distribution of the number of layers.
Figure 12B:
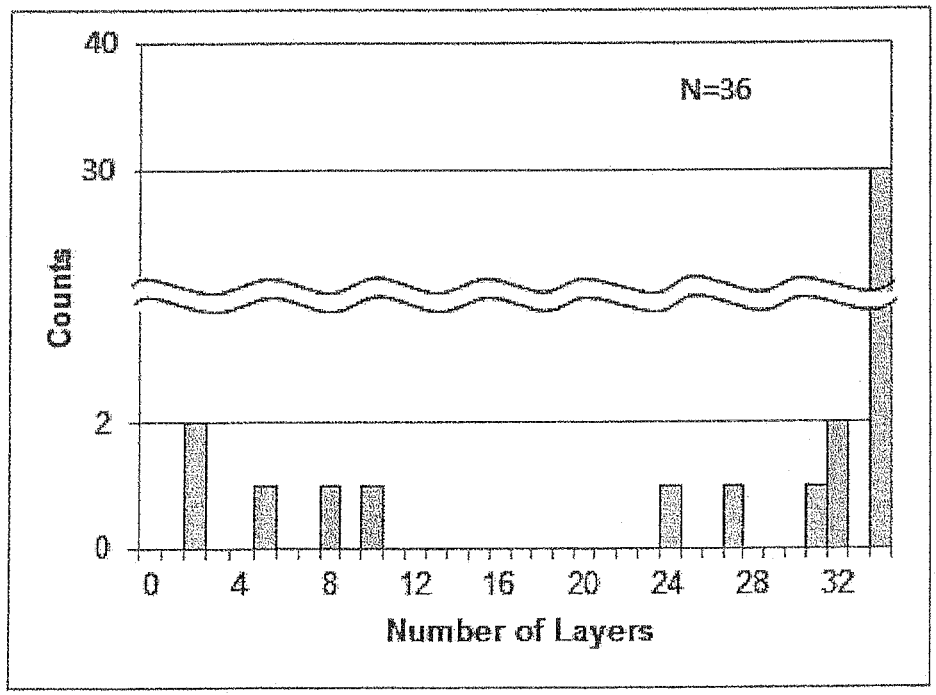

With reference to FIG. 12, a particle size distribution (distribution of sizes) of thin flakes included in the dispersion of Sample 1 (Rate (R3) of 23%) of the comparative example was a distribution having a peak of 0.9 μm. In addition, as for the number of layers, a distribution in which those having 30 layers or more occupied the greater portion and in which graphene having 10 layers or less were 10% was observed.

From the results, it was revealed that, when the product of Sample 5 produced by the production apparatus B was used as a graphene precursor, a highly-concentrated graphene dispersion which contains plenty of graphene of 10 layers or less and which has excellent dispersibility of graphene can be obtained.

Next, with reference to FIG. 13, a relation between the Rate (3R) of the graphene precursor and the number of layers in the graphene dispersion will be described. Samples 1, 5 and 6 in FIG. 13 are those described above. Samples 2, 3 and 4 were produced by the production apparatus B which carried out a treatment based on a ball mill and a microwave treatment, and were graphene dispersions produced using graphene precursors which had been produced by making the irradiating time of microwaves shorter than that for Sample 5. In addition, Sample 7 was produced by the production apparatus A which carried out a treatment based on a jet mill and a plasma treatment, and was a graphene dispersion produced by using a graphene precursor which had been produced by applying plasma of a higher output than that for Sample 6.

From FIG. 13, as to Samples 2 and 3 showing Rates (3R) of 31% and 38%, respectively, the distributions of the number of layers have peaks at around 13 as the number of layers; that is, the shapes of the distributions are close to that of a normal distribution (dispersions using Samples 2 and 3). As to Samples 4 to 7 showing Rates (3R) of 40% or more, the distributions of the number of layers have peaks at several as the number of layers (thin graphene); that is, the shapes of the distributions are those of a so-called lognormal distribution. On the other hand, as to Sample 1 having a Rate (3R) of 23%, the distribution thereof has a peak at 30 or more as the number of layers (a dispersion using Sample 1). That is, it is understood as follows: there is a tendency that, in cases where the Rate (3R) reaches 31% or more, the shapes of the layer number distributions differ from those for cases where the Rate (3R) is less than 31%; and further, in cases where the Rate (3R) reaches 40% or more, the shapes of the layer number distributions clearly differ from those for cases where the Rate (3R) is less than 40%. In addition, it can be understood that, as to proportions of graphene of 10 layers or less, the Rate (3R) of the dispersion using Sample 3 is 38%, while the Rate (3R) of the dispersion using Sample 4 is 62%, and that, when the Rate (3R) reaches 40% or more, a proportion of graphene of 10 layers or less rapidly increases.

From these facts, it can be considered that graphene of 10 layers or less are easily exfoliated in cases where the Rate (3R) is 31% or more, and that, as the Rate (3R) increases to 40%, 50% and 60%, graphene of 10 layers or less are more easily exfoliated. In addition, focusing on the intensity ratio P1/P2, Samples 2 to 7 show values within a comparatively narrow range of 0.012 to 0.016, and any of them are preferable because they exceed 0.01 where it is considered that graphene is easily exfoliated since crystal structures will be deformed.

Figure 14:
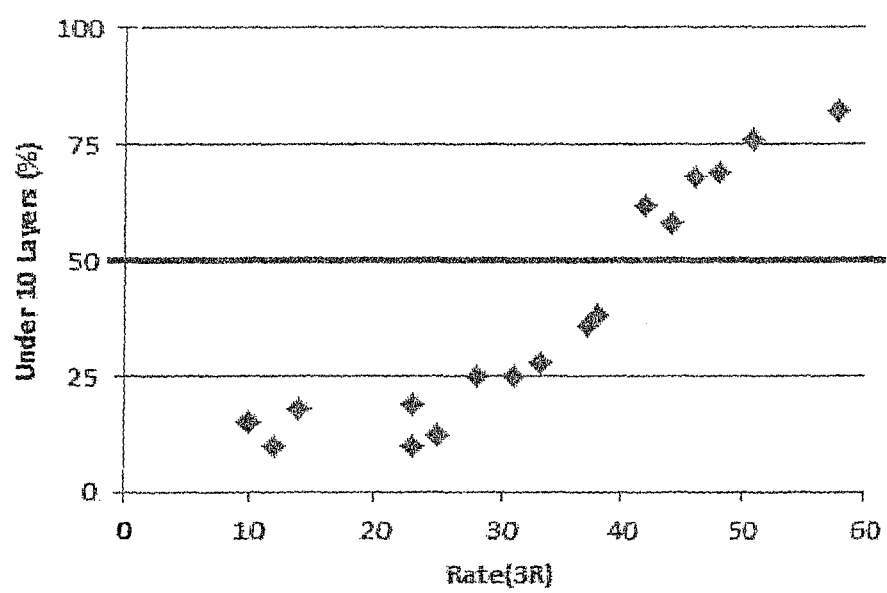
FIG. 14 is a diagram which shows proportions of graphene having 10 layers or less to a content of rhombohedral crystals dispersed in a dispersion.

Furthermore, results obtained by comparing Rates (3R) and proportions of graphene of 10 layers or less included therein are shown in FIG. 14. With reference to FIG. 14, it was revealed that, when the Rate (3R) reached 25% or more, around 31%, graphene of 10 layers or less started to increase (showing an ever-increasing slope) Further, it was revealed that, around 40%, graphene of 10 layers or less rapidly increased (as to proportions of graphene of 10 layers or less, whereas the Rate (3R) of the dispersion using Sample 3 was 38%, the Rate (3R) of the dispersion using Sample 4 was 62%, and the proportion of graphene of 10 layers or less rapidly increased by 24% as the Rate (3R) increased by 4%), and that a percentage of graphene of 10 layers or less against the total graphene was 50% or more. In addition, the points of black squares in FIG. 14 each correspond to different samples, and above-described Samples 1 to 7 and other samples are included therein.

From the facts, when a sample showing a Rate (3R) of 31% or more is used as a graphene precursor to produce a graphene dispersion, the proportion of distributed graphene of 10 layers or less starts increasing; further, when a sample showing a Rate (3R) of 40% or more is used as a graphene precursor to produce a graphene dispersion, 50% or more of graphene of 10 layers or less are produced. In other words, a graphene dispersion in which graphene is highly concentrated and highly dispersed can be obtained. Furthermore, because almost no graphite-based carbon materials (precursors) included in the dispersion deposit as described above, a concentrated graphene dispersion can easily be obtained. According to this method, even a graphene dispersion whose graphene concentration exceeded 10% can be produced without concentrating it. Particularly, the Rate (3R) is preferably 40% or more from a view point that the proportion of dispersed graphene of 10 layers or less sharply increases to 50% or more.

The above description clarifies the following: when the Rate (3R) is 31% or more, preferably 40% or more, and further preferably 50% or more, separation into graphene of 10 layers or less and thin graphite-based carbon materials of around 10 layers occurs in a greater proportion in many cases; and in the case where these graphite-based carbon materials are used as graphene precursors, a highly-concentrated graphene dispersion that has excellent dispersibility of graphene can be obtained. Still further, Example 5 to be described below clarifies that, in the case where the Rate (3R) is 31% or more, graphite-based carbon materials are useful as a graphene precursor.

Furthermore, an upper limit for the Rate (3R) is considered that the upper limit is not particularly defined. However, it is preferable that the upper limit is defined such that the intensity ratio P1/P2 simultaneously satisfies 0.01 or more, because graphene precursors are easily exfoliated when a dispersion or the like is produced. In addition, in cases of production methods using production apparatuses A and B, the upper limit is about 70%, from a viewpoint that graphene is easily produced. Also, a method combining a treatment based on the jet mill of the production apparatus A and a plasma treatment is more preferable, because a graphene precursor having a higher Rate (3R) can easily be obtained. Additionally, the Rate (3R) as long as it reaches 31% or more by combining the physical-force-based treatment and the radiowave-force-based treatment.

EXAMPLE 2

Figure 15A:
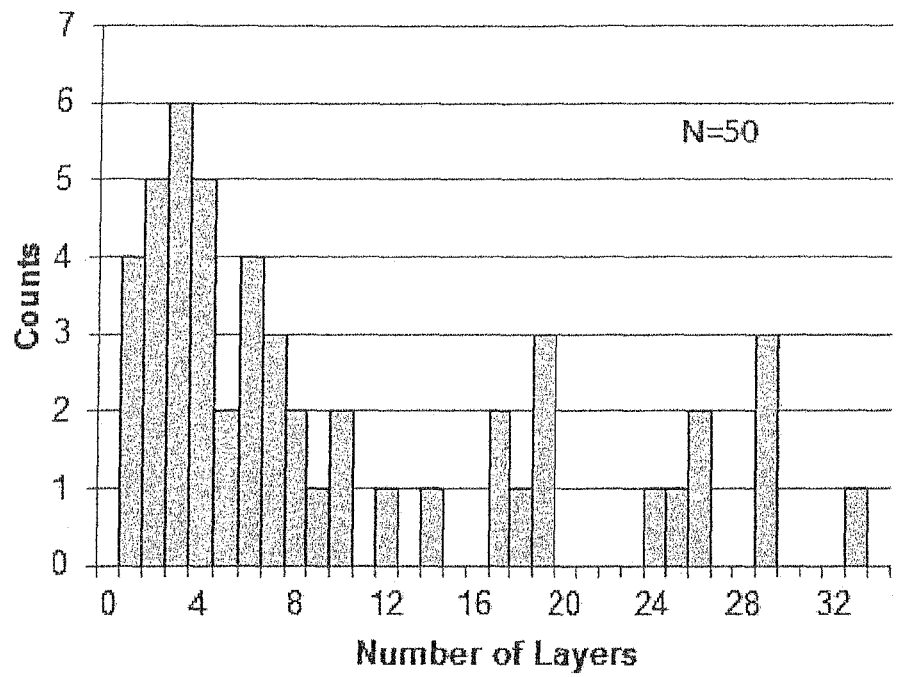
FIGS. 15(a) and 15(b) are figures which show a distribution state of graphite when varying conditions for producing a dispersion using a graphite-based carbon material (precursor) of Sample 5 according to Example 2, where 15(a) is a diagram showing a distribution in a case where an ultrasonic treatment and a microwave treatment were combined, while 15(b) is a diagram showing a distribution of the number of layers in a case where an ultrasonic treatment was conducted.
Figure 15B:
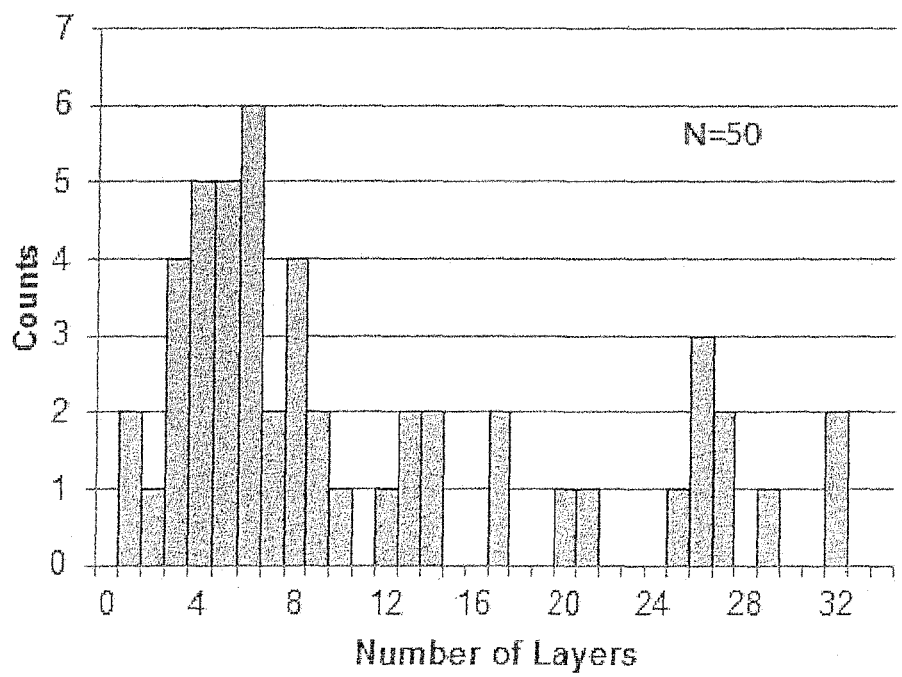
Figure 16:
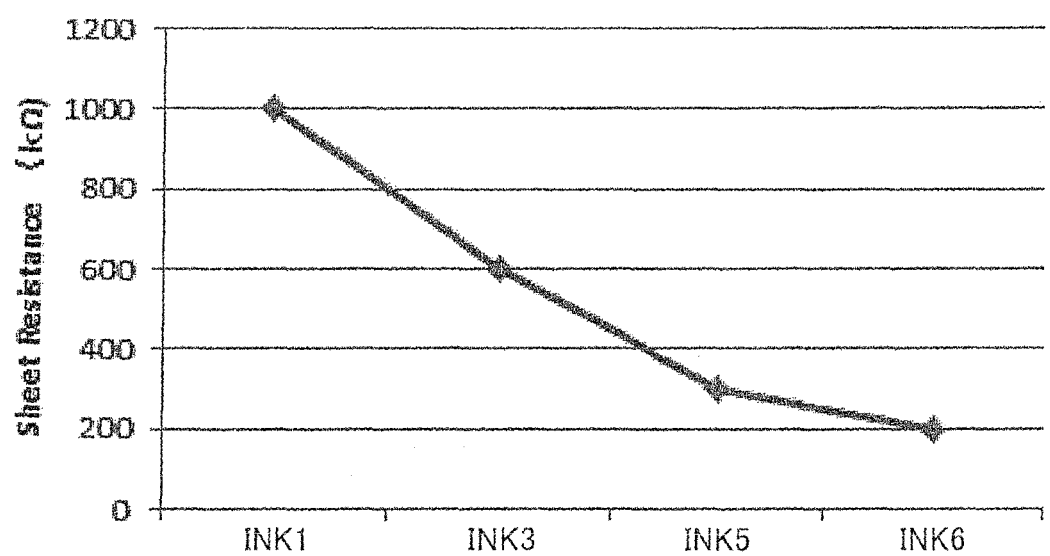
FIG. 16 is a diagram which shows a resistance value when a graphite-based carbon material of Example 3 was dispersed in a conductive ink.

In Example 1, a case where the ultrasonic treatment and the microwave treatment were combined for obtaining a graphene dispersion is explained. In Example 2, only an ultrasonic treatment was carried out while a microwave treatment was not carried out, and other conditions were the same as those for Example 1, FIG. 15(b) shows a distribution of a number of layers with respect to a graphene dispersion which was obtained by carrying out an ultrasonic treatment using the graphene precursor of Sample 5 (Rate (3R)=46%) produced by the production apparatus B. In addition, FIG. 15(a) is the same as the distribution shown in FIG. 11(b) of Sample 5 produced by the production apparatus B of Example 1.

As a result, although the tendency of the distribution of the number of layers was almost similar, a proportion of graphene of 10 layers or less was 64%, and was slightly decreased, compared with 68% of Example 1. From the fact, it was revealed that it was more effective to simultaneously carry out two of the treatments based on a physical force and a radiowave force for producing a graphene dispersion.

EXAMPLE 3

In Example 3, an example used for a conductive ink will be described.

Sample 1 (Rate (3R)=23%), Sample 3 (Rate (3R)=38%), Sample 5 (Rate (3R)=46%) and Sample 6 (Rate (3R)=51%) of Example 1 were used as graphene precursors in mixture solution of water and an alcohol of the carbon number of 3 or less, which severed as a conductivity-imparting agent, at concentrations adopted for conductive inks, thus producing INK1, INK3, INK5 and INK6, and their resistance values were compared. Based on the results, as the Rates (3R) became higher, the resistance values were lower.

EXAMPLE 4

In Example 4, an example in which a graphene precursor was kneaded with a resin will be explained.

When a resin sheet, in which graphene was dispersed, was produced, the tensile strength was very superior although glass fibers were added thereto. Therefore, a factor for this was studied, and, consequently, a finding that a compatibilizer added simultaneously with the glass fibers contributed to formation of graphene from the precursor could be obtained. Therefore, products obtained by mixing dispersing agents and a compatibilizer into a resin were studied.

1 wt % of Sample 5 (Rate (3R)=46%) of Example 1 was added as a precursor directly to LLDPE (polyethylene), and the mixture was kneaded while applying shear (a shearing force) thereto with a kneader, two-shaft kneader (extruder) or the like.

It has been publicly known that, when a graphite-based carbon materials turned into graphene, being highly dispersed in a resin, the tensile strength increases. Therefore, by measuring a tensile strength of the resin, degrees of exfoliating into graphene and dispersion can relatively be estimated. The tensile strength was measured with an exact tabletop general-purpose testing machine (AUTOGRAPH AGS-J) manufactured by Shimadzu Corporation under a condition of test speed of 500 mm/min.

In addition, in order to compare degree of exfoliating into graphene and dispersibility depending on the presence or absence of additives, the following comparisons of three types of (a), (b) and (c) were carried out.
(a) No additives
(b) a general dispersing agent (zinc stearate)
(c) a compatibilizer (a graft-modified polymer)

Figure 17:
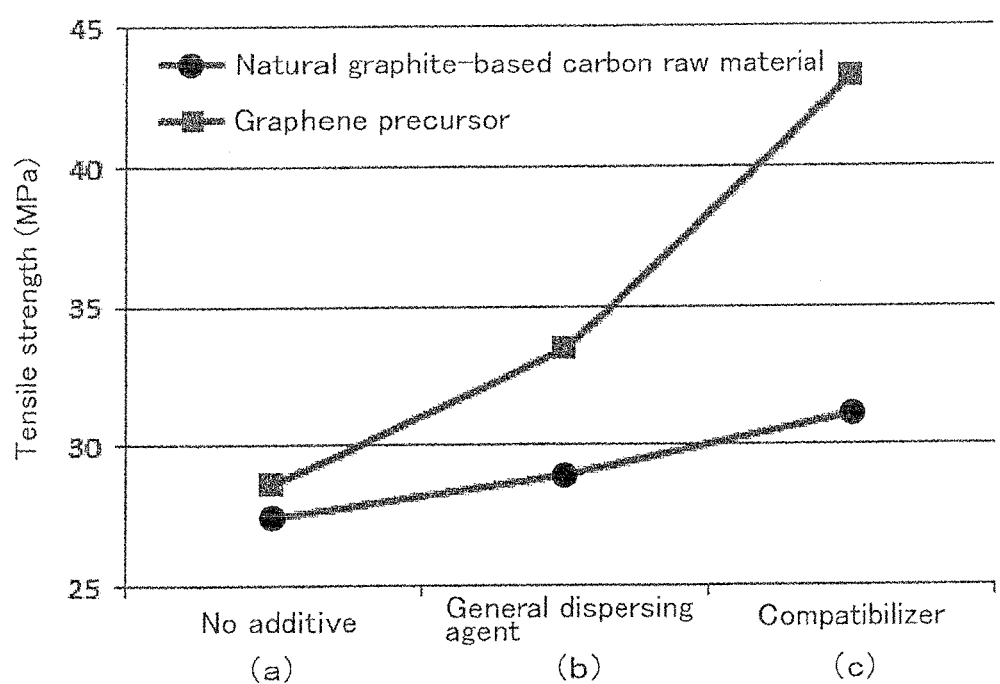
FIG. 17 is a diagram which shows a tensile strength when a graphite-based carbon material of Example 4 was kneaded with a resin.

With reference to FIG. 17 showing the measurement results, the results will be explained. In addition, in FIG. 17, circles refer to resin materials using Sample 1 of the comparative example, and squares refer to resin materials using Sample 5 of Example 1, In case (a) where no additive was added, a difference of the tensile strengths was small.

In case (b) where the dispersing agent was added, it was revealed that formation of graphene was promoted to a certain degree in the graphene precursor of Sample 5.

In case (c) where the compatibilizer was added, it was revealed that that formation of graphene was significantly promoted in the graphene precursor of Sample 5. This is because it is considered that, besides effects to disperse graphene, the compatibilizer binds the graphene layer-bound bodies and the resin, and acts on them such that the graphene layer-bound bodies are stripped therefrom, when applying shear in that state.

Zinc stearate is explained above as an example of the dispersing agent. However, those suited for compounds may be selected. As examples of the dispersing agent, anionic (anion) surfactants, cationic (cation) surfactants, zwitterionic surfactants, and nonionic surfactants can be mentioned. In particular, anion surfactants and nonionic surfactants are preferable for graphene. Nonionic surfactants are more preferable. Since nonionic surfactants are surfactants which do not dissociate into ions and which show hydrophilic properties by hydrogen bonds with water, as observed in oxyethylene groups, hydroxyl groups, carbohydrate chains such as glucoside, and the like, there is a merit that they can be used in nonpolar solvents, although they do not have a strength of hydrophilicity as high as ionic surfactants. Further, this is because, by varying chain lengths of their hydrophilic groups, their properties can freely be changed from lipophilic properties to hydrophilic properties. As anionic surfactants, X acid salts (as for the X acid, for example, cholic acid, and deoxycholic acid), for example, SDC: sodium deoxycholate, and phosphate esters, are preferable. Furthermore, as nonionic surfactants, glycerol fatty acid esters, sorbitan fatty acid esters, fatty alcohol ethoxylates, polyoxyethylene alkyl phenyl ether, alkyl glycosides, and the like are preferable.

EXAMPLE 5

In order to further verify that those obtained when the Rate (3R) is 31% or more are beneficial as graphene precursors, which is described above in Example 1, an example in which a graphene precursor was kneaded with a resin will be further explained in Example 5. The following explains elastic moduli of resin molded articles in which graphite-based carbon materials containing Samples 1 to 7 in Example 1, having Rates (3R) plotted in FIG. 14, were used as precursors.

(1) Using the above-described graphite-based carbon material as a precursor, 5 wt % of LLDPE (polyethylene: 20201J produced by Prime Polymer Co., Ltd.) and 1 wt % of a dispersant (nonionic surfactant) were mixed in an ion-exchanged water, and the above-described device illustrated in FIG. 8 was actuated under the same conditions, whereby graphene dispersions containing 5 wt % of graphene and graphite-based carbon materials were obtained.

(2) 0.6 kg of the graphene dispersion obtained in (1) was immediately kneaded into a resin of 5.4 kg using a kneader (pressing-type kneader WDS7-30 produced by Moriyama Co., Ltd.), whereby pellets were produced. The kneading conditions are to be described below. It should be noted that the mixing ratio between the resin, and the dispersion was selected so that the amount of the graphene and graphite-based carbon materials mixed therein was eventually 0.5 wt %.

(3) The pellets produced in (2) were formed into a test piece according to JIS K7161 1A (length: 165 mm, width.: 20 mm, thickness: 4 mm) by an injection molding machine.

(4) The elastic modulus (Mpa) of the test piece produced in (3) was measured under a condition of a test speed of 500 mm/min according to JIS K7161 by a table-top type precision universal tester produced by Shimadzu Corporation (AUTOGRAPH AGS-J).

The kneading conditions were as follows.
Kneading temperature: 135° C.
Rotor rotation speed: 30 rpm
Kneading time: 15 minutes
Pressurization in furnace: applying 0.3 MPa for 10 minutes after start, and depressurizing to atmospheric pressure after the 10 minutes elapsed Here, the dispersion of the above-described graphene dispersion into a resin is considered as follows. As the melting point of a resin is generally 100° C. or higher, water evaporates in atmosphere, but in a pressing-type kneader, the inside of a furnace can be pressurized. In the inside of the furnace, the boiling point of water is raised so that the dispersion is kept in a liquid form, whereby an emulsion of the dispersion and the resin can be obtained. After applying pressure for a predetermined time, the inside is gradually depressurized, which causes the boiling point of water to decrease, thereby allowing water to evaporate. Here, graphene confined in water are left in the resin. This causes graphene and graphite-based carbon materials to be dispersed at a high concentration in the resin.

Further, since the graphene and graphite-based carbon materials tend to precipitate in the graphene dispersion as time elapses, the graphene dispersion is kneaded into the resin preferably immediately after the graphene dispersion is obtained.

It should be noted that the following may be used as the means for obtaining the emulsion of the dispersion and the resin, other than the pressing kneader: a chemical thruster; a vortex mixer; a homomixer; a high-pressure homogenizer; a hydroshear; a flow jet mixer; a wet jet mill; and an ultrasonic generator.

Further, the following may be used as a solvent for the dispersion, other than water: 2-propanol (IPA); acetone; toluene; N-methylpyrrolidone (NMP); and N,N-dimethyl formamide (DMF).

Figure 19A:
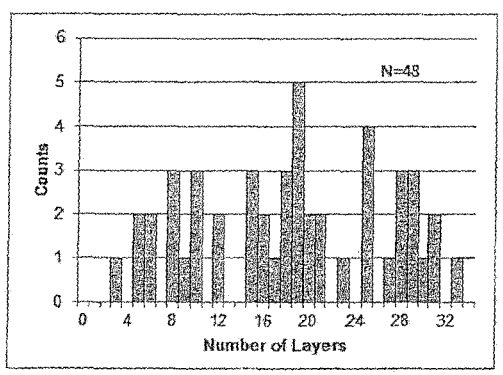
FIGS. 19(a) and 19(b) are figures which show distribution states of a graphite-based carbon material in a dispersion, dispersed in N-methylpyrrolidone (NMP), for providing a supplementary description of a dispersing state of Example 5, where 19(a) is a distribution state of sample 12 and 19(b) is a distribution state of sample 2.
Figure 19B:
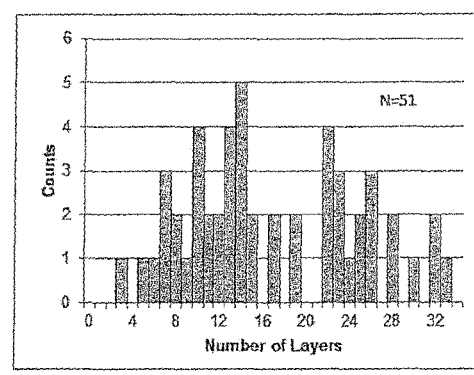

Table 4 illustrates the relationship between the Rates (3R) of around 30% and the elastic moduli of resin molded articles. It should be noted that Sample 00 in Table 4 is a blank Sample in which no precursor was kneaded, Samples 11 and 12 have Rates (3R) between that of Sample 1 and that of Sample 2, and Sample 21 has a Rate (3R) between that of Sample 2 and that of Sample 3.

in NMP. Sample 12 and Sample 2 are compared with each other, and it is found that both of the proportions of graphene (the number of layers are 10 or less) were 25%. On the other hand, as illustrated in FIG. 19, as to Sample 2, the proportion of thin ones having less than 15 layers was greater as compared with Sample 12; in other words, the graphite-based carbon material dispersed as a precursor had a larger surface area, which means that the area thereof in contact with the resin sharply increased.

In this way, Example 5 clearly indicates that when the Rate (3R) is 31% or more, a graphite-based carbon material used as a graphene precursor tends to be separated into graphene having 10 or less layers and a thin graphite-based carbon material.

EXAMPLE 6

In Example 5 where graphene-like graphite alone was dispersed, an elastic modulus was increased, however a significant increase of a tensile strength was not observed.

Thus, experiments were performed by adding the graphene precursor produced by the above methods and a glass fiber to a resin.

TABLE 4

| | Sample No. | | | | | | | |
|---|---|---|---|---|---|---|---|---|
| | 00 | 1 | 11 | 12 | 2 | 21 | 3 | 4 |
| P3/(P3 + P4) | — | 23% | 25% | 28% | 31% | 35% | 38% | 42% |
| Elastic modulus (MPa) (Average in 5 times) | 175 | 197 | 196 | 199 | 231 | 249 | 263 | 272 |
| Difference from blank | — | 12.4% | 12.0% | 13.9% | 31.7% | 42.1% | 50.0% | 55.6% |
| Under-10 layers upon dispersion in NMP (Reference) | — | 10% | 12% | 25% | 25% | 30% | 38% | 62% |

Figure 18:
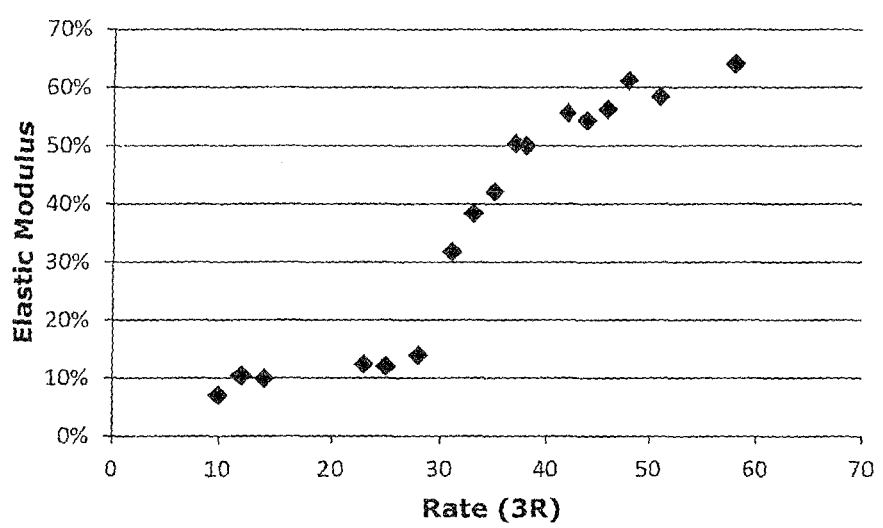
FIG. 18 is a diagram which shows an elastic modulus when a graphite-based carbon material of Example 5 was kneaded with a resin.

FIG. 18 and Table 4 prove that the difference of the elastic modulus with respect to that of Sample 00 (blank) (increase ratio of the elastic modulus) is approximately uniform around 10% until the Rate (3R) reaches 31%; after the Rate (3R) reaches 31%, the difference sharply increases to 32%; while the Rate (3R) increases from 31% to 42%, the difference monotonously increases to 50%; and after the Rate (3R) reaches 42%, the difference slightly increases and converges to around 60%. In this way, when the Rate (3R) is 31% or more, a resin molded article having an excellent elastic modulus can be obtained. Further, since the amount of graphene and graphite-based carbon materials contained in a resin molded article is 0.5 wt %, which is small, influence on properties that the resin originally possesses is small.

It is considered that this tendency attributes to a sharp increase in a thin graphite-based carbon material containing graphene having 10 or less layers in contact with a resin after the Rate (3R) reaches 31%. Here, in Example 5, it is impossible to determine the number of layers of graphene by observation with TEM due to influences of a dispersant used for dispersion in water. Then, only for reference, the reason for the sharp increase described above is considered based on the distribution of the numbers of layers of the graphite-based carbon material illustrated in Table 4 upon dispersion <Various Conditions>
Resin: PP (polypropylene) J707G manufactured by Prime Polymer Co., Ltd.,
Compatibilizer: KAYABRID (006PP manufactured by Kayaku Akzo Corp. Maleic anhydride-modified PP)
Glass fiber (GF): ECS03-631K manufactured by Central Glass Fiber Co., Ltd. (diameter of 13 μm, length of 3 mm),
Graphite-based carbon material: Graphene precursor (produced by above method),
Mixer: Tumbler mixer (manufactured by SEIWA GIKEN Co., Ltd.),
<Mixing condition 1: rotation speed 25 rpm×1 min>,
Kneader: Two-shaft extruder (HYPERKTX 30 manufactured by Kobe Steel, Ltd.),
<Kneading condition 1: cylinder temperature of 180° C., rotor rotation speed of 100 rpm, discharge rate of 8 kg/h>
Test piece: JIS K7139 (170 mm×20 mm×t4 mm)
Measuring device: Exact tabletop general-purpose testing machine AUTOGRAPH AGS-J manufactured by Shima.dzu Corp.
<Experimental Procedures>
Step 1. 40 wt % of a glass fiber (OF), 4 wt % of a compatibilizer, and 56 wt % of a resin are pre-mixed in a tumbler mixer under the mixing condition 1, and then kneaded with a two-shaft extruder under the kneading condition 1 to obtain a master batch 1.

Step 2. 12 wt % of a graphene precursor having a different Rate (3R) as shown in Table 5 and 88 wt % of a resin are pre-mixed with a tumbler mixer under the mixing condition 1, and then kneaded with a two-shaft extruder under the kneading condition 1 to obtain a master batch 2.

Step 3. 25 wt % of the mater batch 1, 25 wt % of the mater batch 2, and 50 wt % of a resin are pre-mixed with a tumbler mixer under the mixing condition 1, and then kneaded with a two-shaft extruder under the kneading condition 1.

Step 4. A kneaded mixture obtained in Step 3 was formed into a test piece with an injection molding machine and changes in mechanical strength thereof were observed at a test speed of 500 mm/min according to JIS K7139.

In order to confirm an effect of graphene-like graphite, experiments were performed with a Rate (3R) of 23% (Sample 1), 31% (Sample 2), 35% (Sample 21), and 42% (Sample 4) with a mixture ratio shown in Table 5.

TABLE 5

| | Mixture ratio (wt %) | | | | | | | | |
|---|---|---|---|---|---|---|---|---|---|
| | | | | Graphene precursor | | | | | |
| | PP | Compatibilizer | GF | Rate (3R) = 23% (Sample 1) | Rate (3R) = 31% (Sample 2) | Rate (3R) = 35% (Sample 21) | Rate (3R) = 42% (Sample 4) | Tensile strength (MPa) | Bending modulus (GPa) |
| Example 6-1 | 86 | 1 | 10 | 3 | — | — | — | 73 | 3.9 |
| Example 6-2 | 86 | 1 | 10 | — | 3 | — | — | 99 | 5.6 |
| Example 6-3 | 86 | 1 | 10 | — | — | 3 | — | 108 | 16.2 |
| Example 6-4 | 86 | 1 | 10 | — | — | — | 3 | 116 | 6.5 |
| Comparative example 6-1 | 100 | — | — | — | — | — | — | 25 | 1.2 |
| Comparative example 6-2 | 89 | 1 | 10 | — | — | — | — | 70 | 3.8 |
| Comparative example 6-3 | 96 | 1 | — | — | 3 | — | — | 27 | 2.5 |

Figure 20:
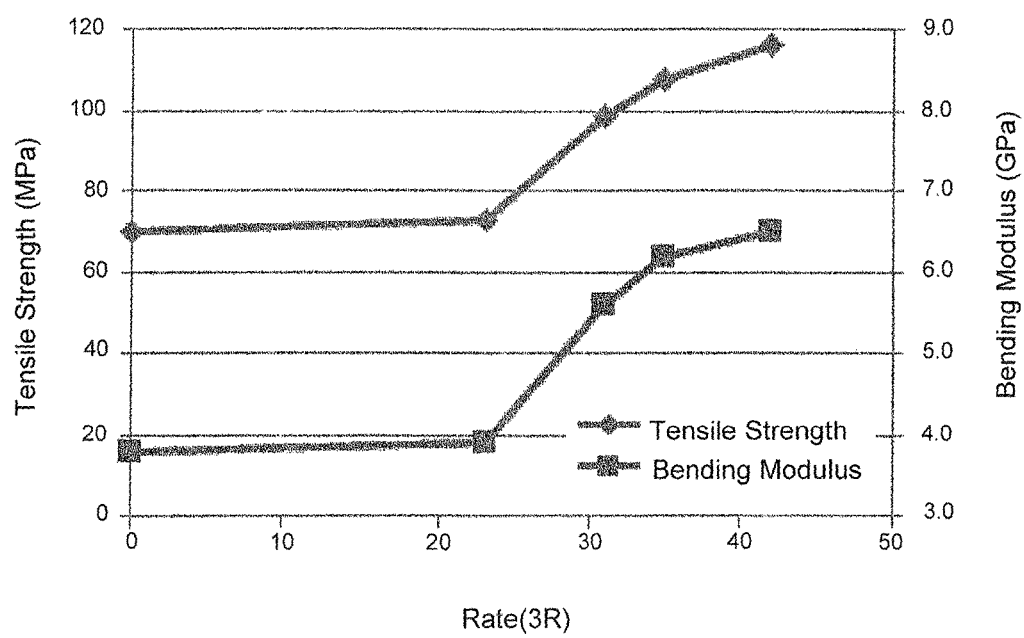
FIG. 20 is a graph which shows a tensile strength and a bending modulus of a test piece of Example 6.

From Table 5 and FIG. 20, it was observed that a tensile strength in Examples 6-2, 6-3, and 6-4 was higher than in Example 6-1 and Comparative examples 6-1, 6-2 and 6-3. In particular, when the Rate (3R) of the graphene precursor reached 31% or more, a remarkable tendency was observed in a tensile strength, which increased by 30% or more as compared with cases of the Rate (3R) being 0% (Comparative example 6-2) (strictly speaking, this is not the same as Rate (3R) 0%. Since a graphene precursor was not added, the 0% data shouldn't be plotted to the same graph. Nevertheless the data is plotted at the position of 0% for convenience. Hereinafter, 0% has the same meaning.) and the Rate (3R) being 23% (Example 6-1). It is noted that data from Comparative examples 6-1 and 6-3, in which CF is not included, are not plotted in FIG. 20.

Further, similarly in the case of a tensile strength, it was observed that a bending modulus in Examples 6-2, 6-3, and 6-4 was higher than in Example 6-1 and Comparative examples 6-1, 6-2 and 6-3. In particular, when the Rate (3R) of the graphene precursor reached 31% or more, a remarkable tendency was observed in a bending modulus, which increased by 40% or more as compared with cases of the Rate (3R) being 0% (Comparative example 6-2) and the Rate (3R) being 23% (Example 6-1)

When the graphene precursors having the Rate (3R) of 31% or more (Examples 6-2, 6-3, and 6-4) are used together with GF, a tensile strength and a bending modulus become higher. This is because, it is speculated that, graphene-like graphite having a thickness of 0.3 to several tens of nm and a size of several nm to 1 μm was dispersed in PP, thereby increasing an elastic modulus of PP itself, and in the same time, the graphene-like graphite brought into contact with GE, which was tightly bound to PP by virtue of a compatibilizer thus hardly coming off PP, executed a so-called wedge action on GE. As a result, a tensile strength and a bending modulus were both increased by a synergistic effect of increasing an elastic modulus of PP itself and executing a wedge action. This situation can be expressed by the following parable: after driving a barbed stake into a ground, it can easily come off a muddy ground, but can hardly come off a well-trodden ground. As another factor causing this, it is speculated that addition of the compatibilizer promotes exfoliation of the graphene-like graphite, etc. from the graphite-based carbon material, thereby causing flaked graphene-like graphite to be present in a larger amount.

When the Rate (3R) is less than 31% (Example 6-1) it is considered that an amount of graphene-like graphite that is dispersed is too small so that an effect of adding a graphene precursor is not sufficiently exerted.

When the Rate (3R) is 35% or more (Examples 6-3 and 6-4), a bending modulus and a tensile strength are excellent as compared with cases of the Rate (3R) being equal to or lower than that. The reason is considered that the amount of graphene-like graphite causing an increase of an elastic modulus of PP becomes larger as compared with the case of the Rate (3R) being 31% (Example 6-2).

Figure 21:
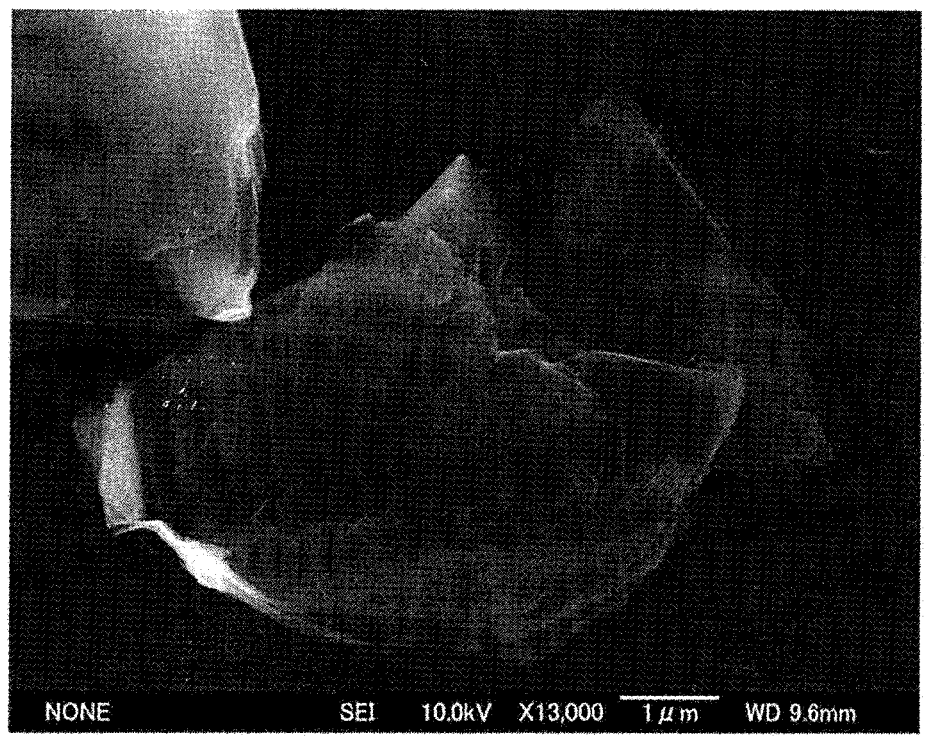
FIG. 21 is a SEM photographed image (plan view) of a graphene precursor.
Figure 22:
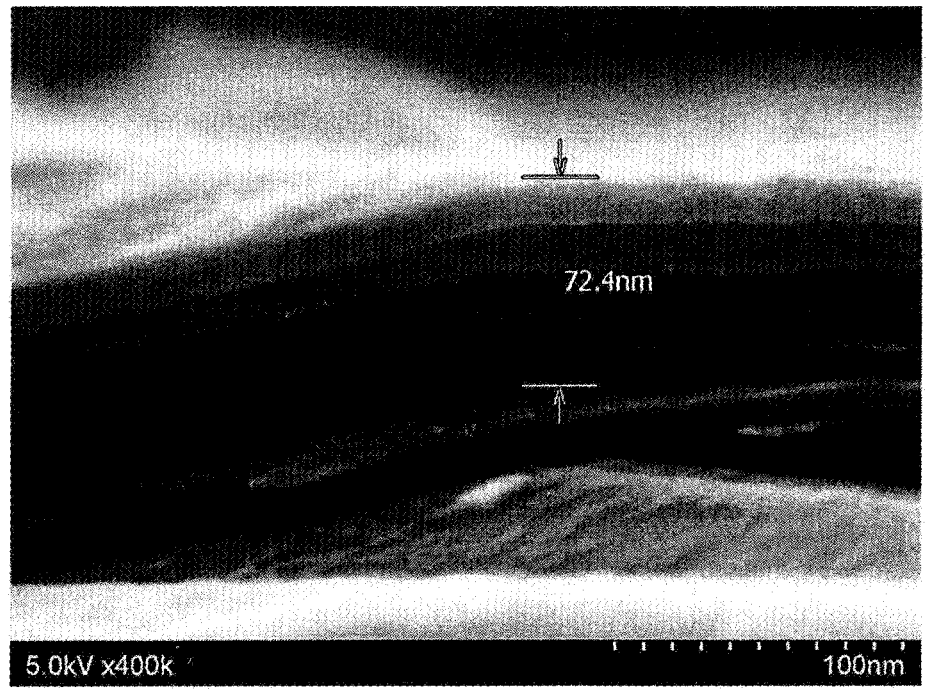
FIG. 22 is a SEM photographed image (side view) of a graphene precursor.

For reference, an explanation is given on photographed images of graphene precursors taken by a scanning electron microscope (SEM). The graphene precursors obtained in Example 1 are a laminate of flaky graphite having a length of 7 μm and a thickness of 0.1 μm as shown for example in FIGS. 21 and 22.

Figure 23:
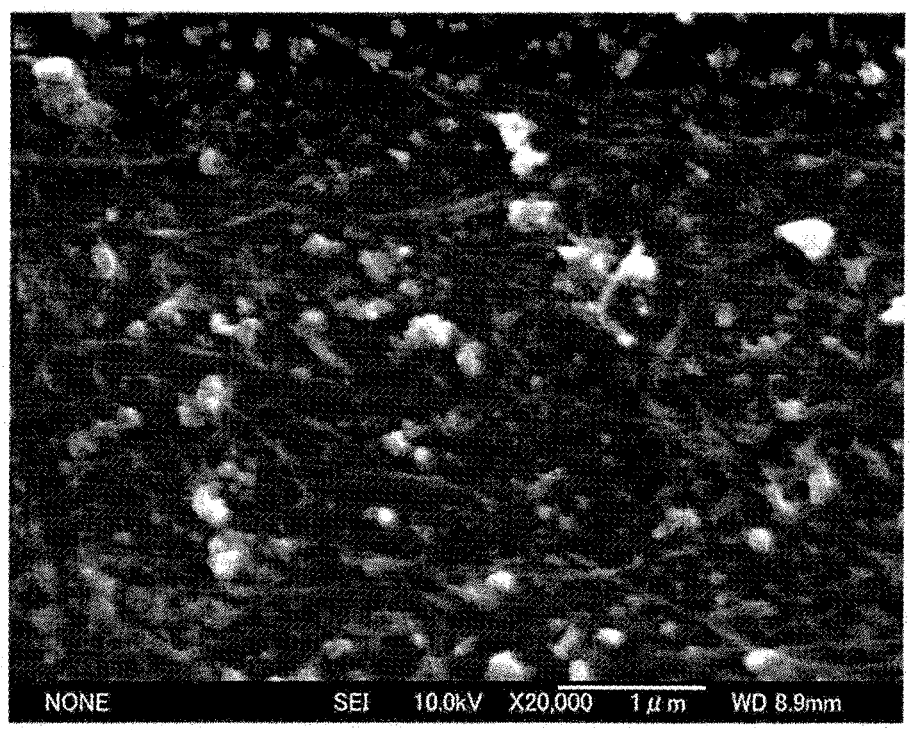
FIG. 23 is a SEM photographed image (cross-section view) of a resin in which graphene-like graphite was dispersed.
Figure 24:
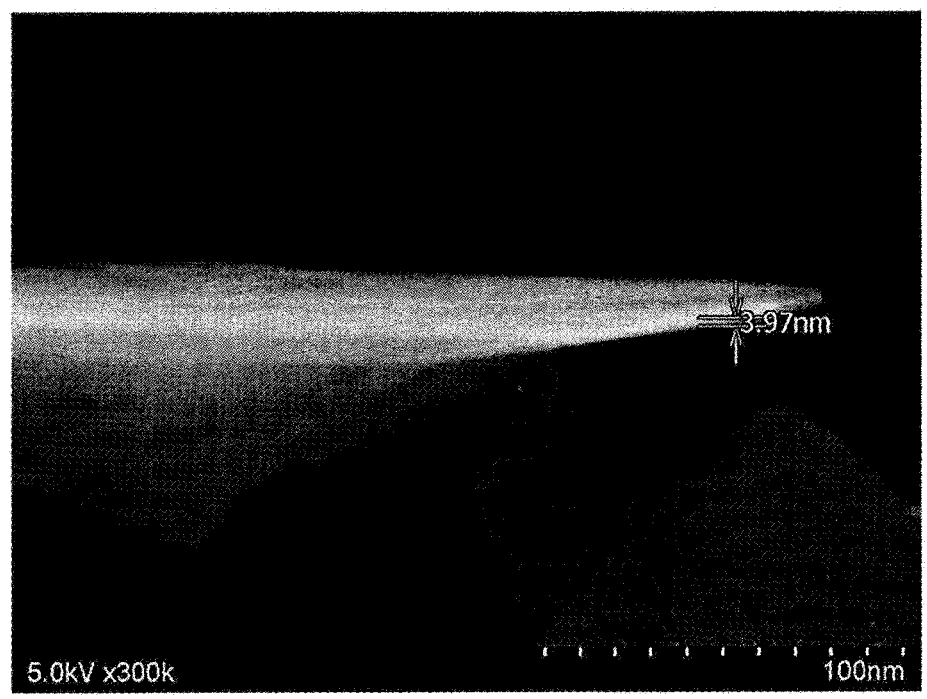
FIG. 24 is a SEM photographed side image (side view) of the graphene-like graphite in FIG. 23.

Further, graphene-like graphite dispersed in a resin can be observed by a scanning electron microscope (SEM) and the like after being formed into a test piece and cut by a precision high-speed saw (TechCut5 manufactured by Allied High Tech Products, Inc.) and the like. For example, FIG. 23 shows a cross section of a resin in which a carbon nanotube and graphene-like graphite are dispersed, where the carbon nanotube is represented by a linear part and the graphene-like graphite is represented by a white spot part. The graphene-like graphite is a laminate of flaky graphite having a thickness of 3.97 nm as shown for example in FIG. 24.

EXAMPLE 7

Experiments were performed to obtain a resin molded article using the graphene precursor produced in the above methods.

<Various Conditions>
Resin: PA66 (66 nylon) 13008 manufactured by Asahi Kasei Corp.,
Compatibilizer: KAYABRII) (006PP manufactured by Kayaku Akzo Corp. Maleic anhydride-modified PP)
Glass fiber (GF): ECS03-631K (diameter of 13 pin, length of 3 mm) manufactured by Central Glass Fiber Co., Ltd.),
Graphite-based carbon material: Graphene precursor (obtained by the above methods),
Mixer: Tumbler mixer (manufactured by SEIWA GIKEN Co., Ltd.),
    <Mixing condition 1: rotation speed 25 rpm×1 min>,
Kneader: Two-shaft extruder (HYPERKTX 30 manufactured by Kobe Steel, Ltd.),
    <Kneading condition 2: cylinder temperature of 280° C., rotor rotation speed of 200 rpm, discharge rate of 12 kg/h>
Test piece: JIS K7139 (170 mm×20 mm×t4 m>,
Measuring device: Exact tabletop general-purpose testing machine AUTOGRAPH AGS-J manufactured by Shimadzu Corp.
<Experimental Procedures>
Step 1. 40 wt % of a glass fiber (GF), 4 wt % of a compa.tibilizer, and 56 wt % of a resin are pre-mixed in a tumbler mixer under the mixing condition 1, and then kneaded with a two-shaft extruder under the kneading condition 2 to obtain a master batch 1.
Step 2. 12 wt % of a graphene precursor having a different Rate (3R) as shown in Table 6 and 88 wt % of a resin are pre-mixed in a tumbler mixer under the mixing condition 1, and then kneaded with a two-shaft extruder under the kneading condition 2 to obtain a master batch 2.
Step 3. 37.5 wt % of the mater batch 1, 25 wt % of the mater batch 2, and 37.5 wt % of a resin are pre-mixed in a tumbler mixer under the mixing condition 1, and then kneaded with a two-shaft extruder under the kneading condition 2.
Step 4. A kneaded mixture obtained in Step 3 was formed into a test piece with an injection molding machine and changes in mechanical strength thereof were observed at a test speed of 500 mm/min according to JIS K7139.

In order to confirm an effect of graphene-like graphite, experiments were performed with a Rate (3R) of 23% (Sample 1), 31% (Sample 2), 35% (Sample 21), and 42% (Sample 4) with a mixture ratio shown in Table 6.

TABLE 6

| | | | | Mixture ratio (wt %) | | | | | |
| | | | | Graphene precursor | | | | | |
| | PA66 | Compatibilizer | GF | Rate (3R) = 23% (Sample 1) | Rate (3R) = 31% (Sample 2) | Rate (3R) = 35% (Sample 21) | Rate (3R) = 42% (Sample 4) | Tensile strength (MPa) | Bending modulus (GPa) |
|---|---|---|---|---|---|---|---|---|---|
| Example 7-1 | 80.5 | 1.5 | 15 | 3 | — | — | — | 111 | 4.9 |
| Example 7-2 | 80.5 | 1.5 | 15 | — | 3 | — | — | 138 | 6.2 |
| Example 7-3 | 80.5 | 1.5 | 15 | — | — | 3 | — | 143 | 6.6 |
| Example 7-4 | 80.5 | 1.5 | 15 | — | — | — | 3 | 146 | 6.8 |
| Comparative example 7-1 | 100 | — | — | — | — | — | — | 57 | 2.7 |
| Comparative example 7-2 | 83.5 | 1.5 | 15 | — | — | — | — | 107 | 4.8 |
| Comparative example 7-3 | 95.5 | 1.5 | — | — | 3 | — | — | 90 | 3.3 |

Figure 25:
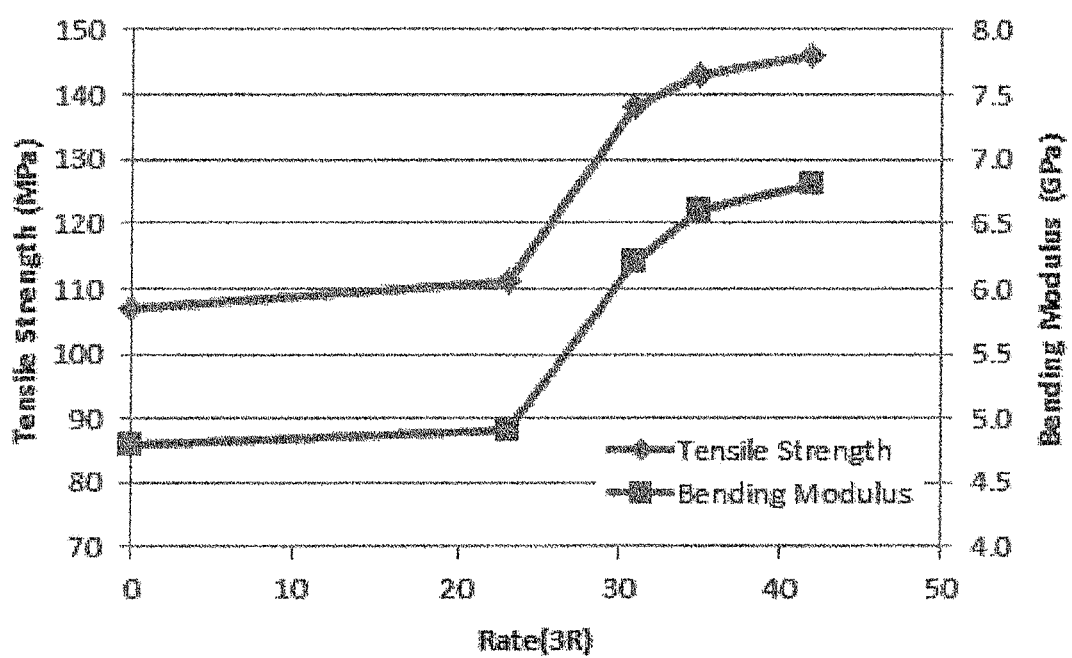
FIG. 25 is a graph which shows a tensile strength and a bending modulus of a test piece of Example 7.

From Table 6 and FIG. 25, it was observed that a tensile strength in Examples 7-2, 7-3, and 7-4 was higher than in Example 7-1 and Comparative examples 7-1, 7-2 and 7-3. In particular, when the Rate (3R) of the graphene precursor reached 31% or more, a remarkable tendency was observed in a tensile strength, which increased by 20% or more as compared with cases of the Rate (3R) being 0% (Comparative example 7-2) and the Rate (3R) being 23% (Example 7-1). It is noted that data from Comparative examples 7-1 and 7-3, in which GE is not included, are not plotted in FIG. 25.

Further, similarly in the case of a tensile strength, it was observed that a bending modulus in Examples 7-2, 7-3, and 7-4 was higher than in Example 7-1 and Comparative examples 7-1, 7-2 and 7-3. In particular, when the Rate (3R) of the graphene precursor reached 31% or more, a remarkable tendency was observed in a bending modulus, which increased by 20% or more as compared with cases of the Rate (3R) being 0% (Comparative example 7-2) and the Rate (3R) being 23% (Example 7-1).

It is considered that a tensile strength and a bending modulus are improved by the same reason as explained in Example 6.

From Examples 6 and 7, it was observed that a tensile strength and a bending modulus were improved regardless of a resin serving as a base material. An explanation is given on a case where a graphene precursor is added together with CF. When the graphene precursors had the Rate (3R) of 23% (Examples 6-1 and 7-1), it was observed that a tensile strength and a bending modulus were slightly improved regardless of a resin serving as a base material as compared with cases where a graphene precursor was not added (Comparative examples 6-2 and 7-2), while when the graphene precursors in use had the Rate (3R) of 31% or more, it was observed that a tensile strength and a bending modulus were sharply improved (by 10% or more).

EXAMPLE 8

Experiments were performed by adding the graphene precursor produced in the above methods and a reinforcing material to a resin.

In Example 8, a glass fiber (GF), a carbon fiber (CF), talc, and silica were used as a reinforcing material to confirm an effect caused by a shape of a reinforcing material. Except for a reinforcing material, experimental conditions and the like are the same as in Example 6.

Figure 27:
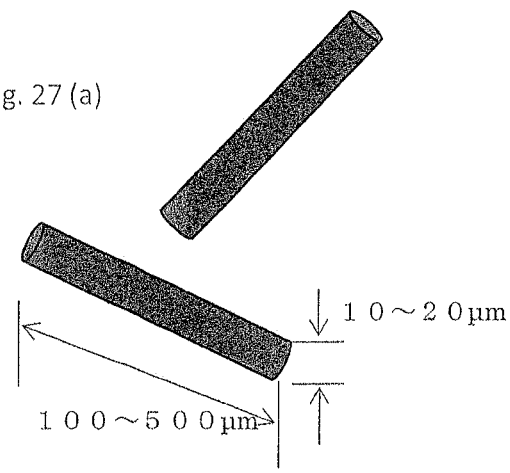
FIGS. 27(a) and 27(b) are schematic views which illustrate a shape of a reinforcing material of Example 8, where 27(a) is a shape of glass fibers and carbon fibers, 27(b) is a shape of talc, and 27(c) is a shape of silica.
Figure 27:
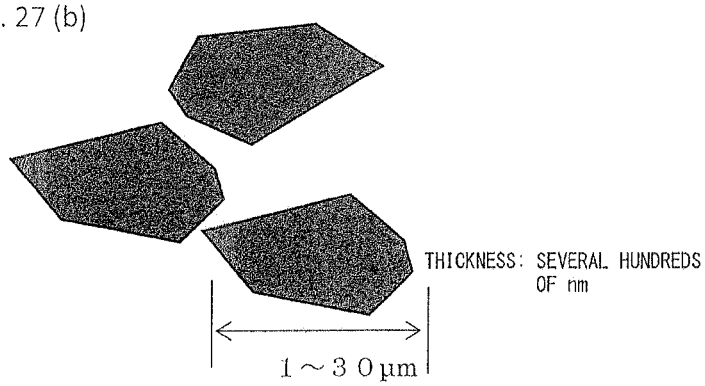
Figure 27:
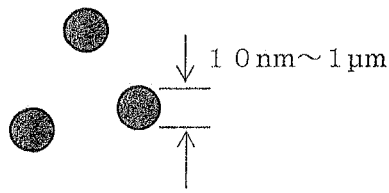

As shown in FIG. 27, GF and CF, functioning as a reinforcing material, have a diameter of several tens of μm and a length of several hundreds of μm in a string-like or linear shape. Talc has a representative length of several to several tens of μm and a thickness of several hundreds of rim in a flake-like shape, while silica has a diameter of several tens of nm to several μm in a particulate shape.

TABLE 7

| | PP | Compatibilizer | GF | CF | Talc | Silica | Grapheme precursor Rate (3R) = 31% (Sample 2) | Tensile strength (MPa) | Bending modulus (GPa) |
|---|---|---|---|---|---|---|---|---|---|
| Example 6-2 | 86 | 1 | 10 | — | — | — | 3 | 99 | 5.6 |
| Example 8-1 | 86 | 1 | — | 10 | — | — | 3 | 168 | 6.7 |
| Example 8-2 | 86 | 1 | — | — | 10 | — | 3 | 45 | 4.0 |
| Example 8-3 | 86 | 1 | — | — | — | 10 | 3 | 33 | 3.8 |
| Comparative example 6-2 | 89 | 1 | 10 | — | — | — | — | 70 | 3.8 |
| Comparative example 8-1 | 89 | 1 | — | 10 | — | — | — | 130 | 5.2 |
| Comparative example 8-2 | 89 | 1 | — | — | 10 | — | — | 35 | 3.5 |
| Comparative example 8-3 | 89 | 1 | — | — | — | 10 | — | 32 | 1.9 |
| Comparative example 6-1 | 100 | — | — | — | — | — | — | 25 | 1.2 |

Figure 26:
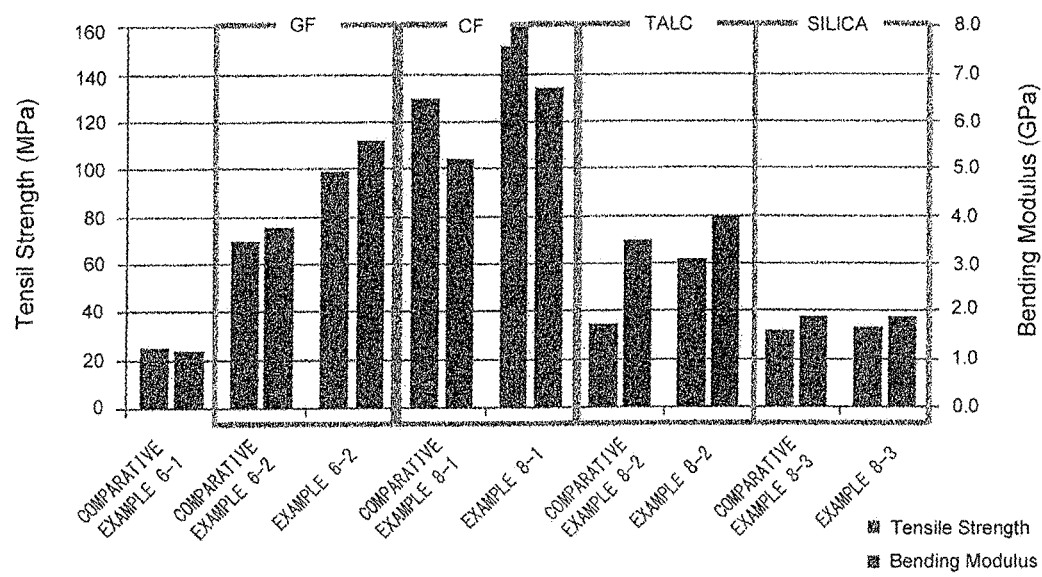
FIG. 26 is a graph which shows a tensile strength and a bending modulus of a test piece of Example 8 in which a shape of a reinforcing material was changed.

As shown in Table 7 and FIG. 26, a tensile strength and a bending modulus are improved in all cases where a reinforcing material is added as compared with Comparative example 6-1 where a reinforcing material is not added. A comparison was made between cases where a reinforcing material and a graphene precursor were added (Examples 6-2, 8-1, 8-2, and 8-3) and cases where a reinforcing material alone was added (Comparative examples 6-2, 8-1, 8-2, and 8-3). When GE was added as a reinforcing material together with a graphene precursor, a tensile strength and a bending modulus were both improved by 1.4 times and 1.4 times, respectively (a rate change observed in Example 6-2 over Comparative example 6-2). Similarly, a tensile strength and a bending modulus were improved by 1.3 times and 1.3 times, respectively in a case of CE, 1.3 times and 1.1 times, respectively in a case of talc, and 1.0 times and 2.0 times, respectively in a case of silica. From these, it was found that using a reinforcing material in a string-like, linear, or flake-like shape together with a graphene precursor improved a tensile strength and a bending modulus by 10% or more, thus being preferable. It is speculated that a nano-reinforcing material in a string-like, linear or flake-like shape, by having a wide surface area per unit mass due to its shape, is highly effective in improving a tensile strength as well as capable of increasing a bending modulus, therefore having high compatibility with graphene-like graphite. It was also revealed that, as a reinforcing material in a string-like, linear, or flake-like shape, the one having an aspect ratio of 5 or more is particularly preferable. In contrast, a reinforcing material having an aspect ratio of 5 or less, such as silica, resulted in increasing a bending modulus only. It is noted that an aspect ratio of a material having a flake-like shape can be obtained by calculating a ratio of an average thickness to a length of the longest part. An aspect ratio mentioned here can be calculated by using an average value of a diameter or a thickness and an average value of a length, described in a catalog and the like of a reinforcing material. Especially, when a catalog and the like are not available, a material is observed by an electron microscope such as SEM in an arbitrary number to obtain average values of length and thickness thereof, from which an aspect ratio is calculated.

EXAMPLE 9

Next, experiments were performed to obtain a resin molded article using the graphene precursor produced in the above methods.

The experiments were performed with a mixture ratio of the graphene precursor having the Rate (3R) of 31% to a reinforcing material under conditions shown in Table 8. Experimental conditions and the like are the same as in Example 6.

TABLE 8

| | PP | Compatibilizer | GF | Graphene precursor Rate (3R) = 31% (Sample 2) | Tensile strength (MPa) | Bending modulus (GPa) |
|---|---|---|---|---|---|---|
| Example 9-1 | 88 | 1 | 10 | 1 | 87 | 4.7 |
| Example 6-2 | 86 | 1 | 10 | 3 | 99 | 5.6 |
| Example 9-2 | 84 | 1 | 10 | 5 | 107 | 6.3 |
| Example 9-3 | 81 | 1 | 10 | 8 | 116 | 6.9 |
| Example 9-4 | 79 | 1 | 10 | 10 | 120 | 7.1 |
| Example 9-5 | 74 | 1 | 10 | 15 | 121 | 7.2 |
| Example 9-6 | 88.5 | 1 | 10 | 0.5 | 80 | 4.5 |
| Example 9-7 | 88.7 | 1 | 10 | 0.3 | 79 | 4.2 |
| Example 9-8 | 88.9 | 1 | 10 | 0.1 | 73 | 4.0 |
| Comparative example 6-1 | 100 | — | — | — | 25 | 1.2 |
| Comparative example 6-2 | 89 | 1 | 10 | — | 70 | 3.8 |

Figure 28:
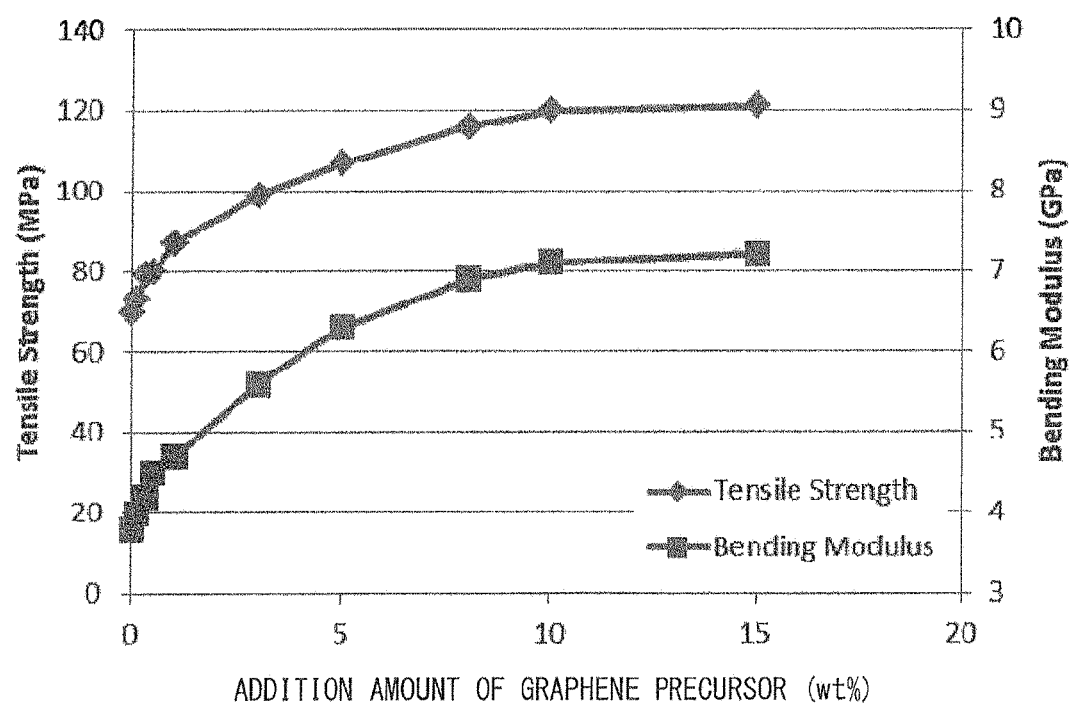
FIG. 28 is a graph which shows a tensile strength and a bending modulus of a test piece of Example 9 in which a mixture ratio of a graphene precursor to a reinforcing material was changed.

As shown in Table 8 and FIG. 28, when the mixture ratio of the graphene precursor to the reinforcing material became more than 1 (Example 9-4), it was observed that a tensile strength and a bending modulus stayed at mostly the same values and their characteristics became saturated. Further, when the mixture ratio of the graphene precursor is 10 or more, an impact on properties of a base material becomes significant. On the other hand, when the mixture ratio was 1/100 (Example 9-8), it was observed that a tensile strength and a bending modulus were increased by 4% or more and 10% or more, respectively, as compared with Comparative example 6-2 where a graphene precursor was not added. Further, it was observed that a tensile strength was sharply increased when the mixture ratio was 1/10 (Example 6-2) or more, while a bending modulus was sharply increased when the mixture ratio was 1/3 (Example 9-1) or more.

Based on these, a lower limit of the mixture ratio is 1/100 or more, preferably 1/10 or more, and an upper limit thereof is 10 or less, preferably 1 or less.

It is noted that data from Comparative example 6-1 where GF is not included is not plotted in FIG. 28.

In Example 6-9, the graphene precursor is produced by a radiowave force-based treatment and/or a physical force-based treatment as described above, thus it is not necessary to perform an oxidation/reduction treatment. Further since a reduction treatment is not necessary to produce a test piece, high temperature is not required, as a result, producing a test piece is readily performed.

The foregoing explained the embodiments of the present invention using drawings, however it should be understood that the specific constitutions are not at all restricted to these embodiments, and changes and additions are also included in the present invention without departing from the gist of the present invention.

Examples of a base material for dispersing a reinforcing material and a graphite-based carbon material include the following. It is noted that a mixture ratio of a base material may be smaller than that of a reinforcing material or a graphite-based carbon material. Further, a base material may be annihilated by combustion, oxidation, vaporization, evaporation, and the like when in use. For example, when a base material as a coating agent and the like is a volatile solvent, the base material is carbonized by combustion, as is the case for a C/C composite.

Examples of a resin include thermoplastic resins such as polyethylene (PE), polypropylene (PP), polystylene (PS), polyvinyl chloride (PVC), ABS resins (ABS), polylactic acid (PLA), acrylic resins (PMMA), polyamide/nylon (PA), polyacetal (POM), polycarbonate (PC), polyethylene telephthalate (PET), cyclic polyolefin (COP), polyphenylene sulfide (PPS), polytetrafluoroethylene (PTFE), polysulfone (PSF), polyamide imide (PAI), thermoplastic polyimide (PI), polyether ether ketone (PEEK), crystalline polymers (LCP), and the like. In addition, among synthetic resins: as thermosetting resins or ultraviolet curing resins, included are epoxy resins (EP), phenolic resins (PF), melamine resins (MF), polyurethanes (PUR), and unsaturated polyester resins (UP) and the like; as conductive polymers, included are PEDOT, polythiophene, polyacetylene, polyaniline, polypyrrole, and the like; as fibers, included are fibrous nylon, polyesters, acryl, vinylon, polyolefin, polyurethane, rayon and the like; as elastomers, included are isoprene rubbers (IR), butadiene rubbers (BR), styrene/butadiene rubbers (SBR), chloroprene rubbers (CR), nitrile rubbers (NBR), polyisobutylene rubbers/butyl rubbers (IIR), ethylene propylene rubbers (EPM/EPDM), chlorosulfonated polyethylene (CSM), acrylic rubbers (ACM), epichlorohydrin rubbers (CO/ECO), and the like; as thermosetting resin-based elastomers, included are some urethane rubbers (U), silicone rubbers (Q), fluorine-containing rubbers (FKM), and the like; and, as thermoplastic elastomers, included are elastomers based on styrene, olefin, polyvinyl chloride, urethane, and amide.

Examples of an inorganic material include concrete, ceramics, gypsum, metal powders, and the like.

Examples of a reinforcing material include the following.

As a metal material included are silver nanoparticles, copper nanoparticles, silver nanowires, copper nanowires, flaky silver, flaky copper, iron powders, zinc oxide, fibrous metal (boron, tungsten, alumina, and silicon carbide), and the like.

As a carbon material included are carbon black, carbon fibers, CNT, graphite, activated carbon, and the like.

As a nonmetal material except for carbon, included are glass fibers, nanocelluloses, nanoclay (clay mineral such as montmorillonite), aramid fibers, polyethylene fibers, and the like.

In addition, as an example of natural graphite for producing a graphite-based carbon material useful as a graphene precursor, particles of 5 mm or less of a natural graphite material (flaky graphite ACE-50 manufactured by Nippon Graphite Industries, ltd.) is described above. However, as for the natural graphite, products which are flaky graphite, being pulverized into 5 mm or less, and which have a Rate (3R) of less than 25% and an intensity ratio P1/P2 of less than 0.01 are preferable, from a viewpoint that they are easily-available corresponding to recent technology development, natural graphite-like graphite (in which crystals are stacked in layers) can be artificially synthesized, thus raw materials for graphene and graphene-like graphite are not limited to natural graphite (mineral). Artificial graphite having a high degree of purity is preferably used for a purpose of controlling a metal content. Further, as long as a Rate (3R) is 31% or more, artificial graphite, which is not produced by a physical force-based treatment or a radiowave force-based treatment described above, may be used.

It should be noted that a graphite-based carbon material useful as a graphene precursor is generally referred to as graphene, a graphene precursor, a graphene nanoplatelet (GNP), few-layer graphene (FLG), nanographene, and the like, however it is not particularly limited thereto.

INDUSTRIAL APPLICABILITY

The present invention covers a composite reinforcing material having strength, and an application field thereof is not limited. For example, the following fields are included in the present invention.

(1) Examples in which a base material is an organic material (resins and plastics)

(1-1) Conveyance for transporting

Airplanes, automobiles (passenger cars, trucks, buses, etc.), ships, cases for toys, etc., structure members such as parts. (for structure members, composite resins, modified resins, fiber reinforced resins, and the like)

(1-2) General-purpose articles

Furniture, home electric appliance, household supplies, cases for toys, etc., structure members such as parts.

(1-3) 3D printers

Various kinds of molding materials, such as resin filaments and DV curing resins, used in fused deposition modeling (FDM), stereolithography (SLA), powder sticking lamination, selective laser sintering (SLS), and multi jet modeling (MJM, ink jet modeling)

(1-4) Coating agents

A composite reinforcing material is, together with a resin, dispersed in an organic solvent and used to coat a surface of subjects by spraying or painting, etc. Such a coating agent improves strength of subjects and also has effects of water repellency, rust resistance, ultraviolet ray resistance, etc. Examples of application include use for external and internal coating of constructions (bridge piers, buildings, walls, roads, etc.), automobiles, airplanes, etc., and for resin molded articles such as helmets and protectors.

(2) Examples in which a base material is an inorganic material

Fiber-reinforced structure members, such as cement (concrete, mortar), gypsum boards, ceramics, and C/C composites (carbon fiber-reinforced carbon composite materials)

Products made by dispersing graphene-like graphite and a reinforcing material in these inorganic materials as a base material.

(3) Metal materials as a base material

Structure members, such as aluminum, stainless steel, titanium, brass, bronze, soft steel, nickel alloy, and tungsten carbide. (for structure members, fiber-reinforced metal and the like). Products made by dispersing graphene-like graphite and a reinforcing material in these metal materials as a base material.

The invention claimed is:

1. A method of producing a composite reinforcing material, comprising a step of kneading at least a graphite-based carbon material and a reinforcing material into a polymer base material,
the graphite-based carbon material having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more:

$$\text{Rate } (3R) = P3/(P3+P4) \times 100 \qquad \text{Equation 1}$$

wherein
P3 is a peak intensity of a (101) plane of the rhombohedral graphite layer (3R) based on the X-ray diffraction method, and
P4 is a peak intensity of a (101) plane of the hexagonal graphite layer (2H) based on the X-ray diffraction method.

2. The method of producing the composite reinforcing material according to claim 1, wherein the reinforcing material is a microparticle having a string-like, linear, or flake-like shape.

3. The method of producing the composite reinforcing material according to claim 2, wherein the microparticle has an aspect ratio of 5 or more.

4. The method of producing the composite reinforcing material according to claim 1, wherein a weight ratio of the graphite-based carbon material to the reinforcing material is 1/100 or more and less than 10.

5. The method of producing the composite reinforcing material according to claim 2, wherein a weight ratio of the graphite-based carbon material to the reinforcing material is 1/100 or more and less than 10.

6. The method of producing the composite reinforcing material according to claim 1, wherein a compatibilizer is added.

7. A method of producing a composite reinforcing material, comprising a step of kneading at least a graphite-based carbon material and a reinforcing material into a polymer base material, so that graphene is partially exfoliated from the graphite-based carbon material and dispersed in the base material, the graphene being a crystal of a mean size of 100 nm or more and formed in a flake-like or sheet-like shape having 10 or less layers, a proportion of the graphene having 10 layers or less being 25% or more after the kneading step,
the graphite-based carbon material having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more:

$$\text{Rate } (3R) = P3/(P3+P4) \times 100 \qquad \text{Equation 1}$$

wherein
P3 is a peak intensity of a (101) plane of the rhombohedral graphite layer (3R) based on the X-ray diffraction method, and
P4 is a peak intensity of a (101) plane of the hexagonal graphite layer (2H) based on the X-ray diffraction method.

8. The method of producing the composite reinforcing material according to claim 7, wherein the reinforcing material is a microparticle having a string-like, linear, or flake-like shape.

9. The method of producing the composite reinforcing material according to claim 8, wherein the microparticle has an aspect ratio of 5 or more.

10. The method of producing the composite reinforcing material according to claim 7, wherein a weight ratio of the graphite-based carbon material to the reinforcing material is 1/100 or more and less than 10.

11. The method of producing the composite reinforcing material according to claim 8, wherein a weight ratio of the graphite-based carbon material to the reinforcing material is 1/100 or more and less than 10.

12. The method of producing the composite reinforcing material according to claim 7, wherein a compatibilizer is added.

* * * * *

UNITED STATES PATENT AND TRADEMARK OFFICE
CERTIFICATE OF CORRECTION

PATENT NO. : 9,862,834 B2
APPLICATION NO. : 14/982939
DATED : January 9, 2018
INVENTOR(S) : Hasegawa et al.

Page 1 of 1

It is certified that error appears in the above-identified patent and that said Letters Patent is hereby corrected as shown below:

On the Title Page

Item (63), "Related U.S. Application Data," PCT/JP2015/058331 filing date of "May 19, 2015" should be --March 19, 2015--.

Signed and Sealed this
Eighteenth Day of February, 2020

Andrei Iancu
*Director of the United States Patent and Trademark Office*